US012368998B2

(12) United States Patent
Huo et al.

(10) Patent No.: US 12,368,998 B2
(45) Date of Patent: Jul. 22, 2025

(54) SPEAKER AND TERMINAL

(71) Applicant: Huawei Technologies Co., Ltd., Shenzhen (CN)

(72) Inventors: Peng Huo, Dongguan (CN); Cunshuai Liu, Dongguan (CN); Linlin Zhao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/028,382

(22) PCT Filed: Sep. 2, 2021

(86) PCT No.: PCT/CN2021/116261
§ 371 (c)(1),
(2) Date: Mar. 24, 2023

(87) PCT Pub. No.: WO2022/062874
PCT Pub. Date: Mar. 31, 2022

(65) Prior Publication Data

US 2023/0362548 A1 Nov. 9, 2023

(30) Foreign Application Priority Data

Sep. 25, 2020 (CN) ......................... 202011025500.2

(51) Int. Cl.
*H04R 9/02* (2006.01)
*H04R 1/28* (2006.01)
(Continued)

(52) U.S. Cl.
CPC ............. *H04R 9/025* (2013.01); *H04R 1/288* (2013.01); *H04R 7/20* (2013.01); *H04R 9/043* (2013.01);
(Continued)

(58) Field of Classification Search
CPC . H04R 9/06; H04R 9/025; H04R 7/26; H04R 9/063; H04R 9/043; H04R 9/045;
(Continued)

(56) References Cited

U.S. PATENT DOCUMENTS 6,938,726 B1 * 9/2005 Roark ...................... H04R 9/04 181/171
8,335,336 B2 * 12/2012 Kuze ........................ H04R 9/02 381/396
(Continued)

FOREIGN PATENT DOCUMENTS

CN 102595288 A 7/2012
CN 205545891 U 8/2016
(Continued)

*Primary Examiner* — Carolyn R Edwards
*Assistant Examiner* — Julie X Dang
(74) *Attorney, Agent, or Firm* — Conley Rose, P.C.

(57) ABSTRACT

A speaker in which an end of a magnetic assembly close to the diaphragm has a magnetic gap. A coil is wound around a coil former, and at least a portion of the coil is located in the magnetic gap. A connecting member is arranged on a side of the coil former close to a side wall of the accommodating cavity. An annular first damper is arranged between the coil former and the connecting member. The first damper is close to an upper end of the coil and is distal from a lower end of the coil. An annular second damper is arranged between the connecting member and the side wall of the accommodating cavity. The second damper is close to the lower end of the coil and is distal from the upper end of the coil.

20 Claims, 14 Drawing Sheets

(51) Int. Cl.

| | |
|---|---|
| ***H04R 7/20*** | (2006.01) |
| ***H04R 9/04*** | (2006.01) |
| ***H04R 9/06*** | (2006.01) |

(52) U.S. Cl.
CPC ......... *H04R 9/06* (2013.01); *H04R 2307/201* (2013.01); *H04R 2400/11* (2013.01)

(58) Field of Classification Search
CPC ...... H04R 1/02; H04R 9/022; H04R 2499/13; H04R 2209/041; H04R 2307/201; H04R 1/288; H04R 9/02; H04R 9/04; H04R 2400/01; G10K 9/18; G10K 9/13
USPC ....... 381/386, 186, 396, 385, 431, 412, 401, 381/420, 404, 423, 398, 424, 405, 111, 381/406, 117, 413; 181/163, 147, 171, 181/157
See application file for complete search history.

(56) References Cited

U.S. PATENT DOCUMENTS

| | | | | |
|---|---|---|---|---|
| 2005/0271236 | A1* | 12/2005 | Kobayashi | H04R 31/006 381/396 |
| 2005/0271239 | A1* | 12/2005 | Watanabe | H04R 9/06 381/407 |
| 2006/0120554 | A1* | 6/2006 | Watanabe | H04R 7/18 381/396 |
| 2009/0116680 | A1* | 5/2009 | Funahashi | H04R 9/043 381/400 |
| 2010/0303278 | A1 | 12/2010 | Sahyoun | |
| 2011/0116678 | A1* | 5/2011 | Wang | H04R 9/043 381/407 |

FOREIGN PATENT DOCUMENTS

| | | | |
|---|---|---|---|
| CN | 206674191 | U | 11/2017 |
| CN | 209676465 | U | 11/2019 |
| JP | 2005269331 | A | 9/2005 |

* cited by examiner

SPEAKER AND TERMINAL

CROSS-REFERENCE TO RELATED APPLICATION

This is a U.S. National Stage of International Patent Application No. PCT/CN2021/116261 filed on Sep. 2, 2021, which claims priority to Chinese Patent Application No. 202011025500.2 filed on Sep. 25, 2020. Both of the aforementioned applications are hereby incorporated by reference in their entireties.

TECHNICAL FIELD

This application relates to the field of audio technologies, and in particular, to a speaker and a terminal.

BACKGROUND

A speaker may convert electrical energy into acoustic energy to implement sound output through electroacoustic conversion. In the speaker, an energized coil may drive, under an action of a magnetic field provided by a magnet, a diaphragm to vibrate in a vertical direction perpendicular to the diaphragm, so as to form sound. However, during the operation of the speaker, the coil not only vibrates up and down in the vertical direction, but also swings left and right in a horizontal direction. When the coil moves at a relatively large amplitude, the coil may touch a component around the coil, resulting in abnormal sound, and even causing damage to the speaker.

SUMMARY

Embodiments of this application provide a speaker and a terminal, to reduce an amplitude of left-right swinging of a coil in the speaker in a horizontal direction.

To achieve the foregoing objective, the following technical solutions are used in this application.

According to a first aspect of this application, a speaker is provided. The speaker includes a frame, a diaphragm, a magnetic assembly, a vibrating assembly, a first damper, and a second damper. The frame is provided with a concave accommodating cavity. The diaphragm covers an opening of the accommodating cavity and is connected to the frame. At least a part of the magnetic assembly is arranged in the accommodating cavity and is connected to the bottom of the accommodating cavity, and an end of the magnetic assembly close to the diaphragm has a magnetic gap. The vibrating assembly is located in the accommodating cavity and is connected to the diaphragm. The vibrating assembly includes a coil, a coil former, and a connecting member. The coil is wound around the coil former, and at least a part of the coil is located in the magnetic gap. The connecting member is arranged on a side of the coil former close to a side wall of the accommodating cavity. The first damper is annular, is located in the accommodating cavity, and is arranged between the coil former and the connecting member, an inner side of the first damper is connected to the magnetic assembly, and an outer side of the first damper is connected to the connecting member. The first damper is configured to support the vibrating assembly in a radial direction of the first damper. The first damper is close to an upper end of the coil and is away from a lower end of the coil. The upper end of the coil is close to the diaphragm, and the lower end of the coil is away from the diaphragm. The second damper is annular, is located in the accommodating cavity, and is arranged between the connecting member and the side wall of the accommodating cavity, an inner side of the second damper is connected to the connecting member, and an outer side of the second damper is connected to the side wall of the accommodating cavity. The second damper is configured to support the vibrating assembly in a radial direction of the second damper. The second damper is close to the lower end of the coil and is away from the upper end of the coil.

In conclusion, in a process in which the coil swings left and right, the first damper arranged close to the upper end of the coil may provide, for the upper end of the coil, a first restoring force whose direction is opposite to a swing direction of the coil, so that the upper end of the coil is close to an initial position of the coil (a position of coil when the coil is stationary) as much as possible. In addition, the second damper arranged close to the lower end of the coil may provide, for the lower end of the coil, a second restoring force whose direction is opposite to the swing direction of the coil, so that the lower end of the coil is located at the initial position of the coil as much as possible. In this way, the first damper and the second damper can respectively support the vibrating assembly in the radial directions, so that during the vibration of the coil, an axis of the coil may be overlapped with an axis of the magnetic assembly as much as possible, so as to enable the coil to move up and down mainly in a vertical direction. As a result, an amplitude of left-right swinging (that is, roll swinging) of the coil can be reduced. When the speaker operates in a low frequency state and the amplitude of the coil is relatively large under the drive of a high power signal, by reducing the amplitude of the roll swinging of the coil, a probability that abnormal sound is caused because the coil is in contact with a washer in the magnetic assembly can be effectively reduced, and a sound distortion rate can be reduced.

Optionally, the first damper is located on a side of the coil close to the diaphragm, and the second damper is located on a side of the coil away from the diaphragm. In this way, a vertical projection of the entire coil on the connecting member may be located between a vertical projection of the first damper on the connecting member and a vertical projection of the second damper on the connecting member. In this case, since the first damper is located at the upper end of the coil and is relatively far away from the lower end of the coil, torque provided by the first damper for the upper end of the coil is relatively large. This is more conducive to limiting roll swinging of the upper end of the coil. Similarly, since the second damper is located at the lower end of the coil and is relatively far away from the upper end of the coil, torque provided by the second damper for the lower end of the coil is relatively large. This is more conducive to limiting roll swinging of the lower end of the coil.

Optionally, an end of the coil close to the diaphragm exceeds a surface of the first damper close to the diaphragm. In addition, an end of the coil away from the diaphragm exceeds a surface of the second damper away from the diaphragm. In this case, the first damper is relatively close to the second damper. This is conducive to reducing a thickness of the speaker.

Optionally, there is a first spacing L1 between a geometric center of the vertical projection of the coil on the connecting member and the first damper. In addition, there is a second spacing L2 between the geometric center of the vertical projection of the coil on the connecting member and the second damper. $L1=L2$. In this way, in a process of supporting the coil by the first damper and the second damper, magnitudes of the first restoring force applied by the first damper to the coil and the second restoring force applied by the second damper to the coil may be the same or approximately the same, so that in a process in which the coil vibrates up and down, the axis of the coil can keep overlapped with the axis of the magnetic assembly as much as possible.

Optionally, an elastic coefficient of the first damper is the same as an elastic coefficient of the second damper. In this way, in the process of supporting the coil by the first damper and the second damper, this can be more helpful to make a value of the first restoring force applied by the first damper to the coil close to or the same as a value of the second restoring force applied by the second damper to the coil.

Optionally, an end of the coil close to the diaphragm exceeds a surface of the first damper close to the diaphragm A vertical projection of an end of the coil away from the diaphragm on the connecting member is located between the first damper and the second damper. In this case, the first damper is relatively close to the second damper. This is conducive to reducing the thickness of the speaker.

Optionally, a vertical projection of an end of the coil close to the diaphragm on the connecting member is located between the first damper and the second damper. An end of the coil away from the diaphragm exceeds a surface of the second damper away from the diaphragm. In this case, the first damper is relatively close to the second damper. This is conducive to reducing the thickness of the speaker.

Optionally, the first damper and the second damper are annular, and an axis of an inner hole of the first damper is overlapped with the axis of the coil. An axis of an inner hole of the second damper is overlapped with the axis of the coil. In this way, in the process of supporting the coil by the first damper and the second damper that are arranged concentrically, the magnitudes of the first restoring force applied by the first damper to the coil and the second restoring force applied by the second damper to the coil may be the same or approximately the same, so that in the process in which the coil vibrates up and down, the axis of the coil can keep overlapped with the axis of the magnetic assembly as much as possible.

Optionally, the axis of the coil is overlapped with an axis of the coil former, and an axis of the connecting member is overlapped with the axis of the coil former. In this case, the coil at the initial position and the coil former at an initial position are arranged concentrically. This is helpful to enable the axis of the coil to keep overlapped with the axis of the magnetic assembly as much as possible during the vibration of the coil.

Optionally, the speaker further includes a damper bracket. The damper bracket is located on a side of the magnetic assembly close to the diaphragm, a surface on a side of the damper bracket away from the diaphragm is connected to the magnetic assembly, and a surface on a side of the damper bracket close to the diaphragm is connected to the inner side of the first damper. In this way, the damper bracket can support the inner side of the first damper to prevent the first damper from touching the magnetic assembly when the coil vibrates at a large amplitude.

Optionally, a height of the damper bracket is greater than an amplitude of the vibrating assembly. A direction of the height of the damper bracket is perpendicular to the bottom of the accommodating cavity. In this way, the first damper can be prevented from touching the washer in a process in which the first damper vibrates up and down. Optionally, the magnetic assembly includes a T-yoke, a first magnet, and a washer. The T-yoke includes a base plate and a pole post. The base plate is connected to the bottom of the accommodating cavity, and the pole post is located on a side of the base plate close to the diaphragm and is connected to the bottom. The first magnet is annular and is connected to a surface on the side of the base plate of the T-yoke close to the diaphragm, and the pole post is located in an inner hole of the first magnet. The washer is annular and is connected to a surface on a side of the first magnet close to the diaphragm. The pole post is located in an inner hole of the washer. A magnetic gap is formed between an inner ring of the washer and the pole post. The damper bracket is located on an upper surface of the washer, and the upper surface of the washer is a surface of the washer close to the diaphragm. In this way, the first damper can be connected to a component in the magnetic assembly, for example, the washer, through the damper bracket.

Optionally, in a longitudinal section of the washer, a part close to the diaphragm is a right trapezoid, a part away from the diaphragm is a rectangle, and an inclined edge of the right trapezoid is close to a side wall of the accommodating cavity; and the longitudinal section is perpendicular to the bottom of the accommodating cavity. In this case, on one hand, since a side of an upper half part of the washer close to the side wall of the accommodating cavity is an inclined surface, a gap between the washer and the first damper may be increased. As a result, when an amplitude of the first damper exceeds the height of the damper bracket, the first damper is not easy to touch the washer during the vibration. On the other hand, when the part close to the diaphragm in the longitudinal section of the washer is a right trapezoid and an inclined edge of the trapezoid is located on a side away from the coil, materials of a part of the washer close to the coil are more than those of a part of the washer away from the coil. In this way, during magnetic conduction, the washer can make magnetic lines from the first magnet more concentrated towards a side on which the coil is located, so that an intensity of a magnetic field in which the coil is located is higher. In addition, the part away from the diaphragm in the longitudinal section of the washer is a rectangle. This can avoid damage to the washer caused during processing, assembly, transportation, or the like due to sharp corners at an end of the washer away from the diaphragm.

Optionally, an axis of the inner hole of the first magnet and an axis of the inner hole of the washer are overlapped with an axis of the pole post. The axis of the coil is overlapped with the axis of the pole post. The axis of the pole post may be used as the axis of the magnetic assembly. In this case, the axis of the inner hole of the first magnet at an initial position, the axis of the inner hole of the washer at an initial position, and the axis of the coil at the initial position may be overlapped with each other. This is helpful to enable the axis of the coil to keep overlapped with the axis of the magnetic assembly as much as possible during the vibration of the coil.

Optionally, the magnetic assembly may include a U-yoke, a second magnet, and a pole piece. The U-yoke is provided with a groove, and the bottom of the groove of the U-yoke is connected to the bottom of the accommodating cavity. A surface on a side of a side wall of the groove of the U-yoke close to the diaphragm is connected to the inner side of the first damper. A material of the U-yoke may be iron with relatively high purity. In addition, the second magnet is located in the groove of the U-yoke and is connected to the bottom of the groove of the U-yoke. The second magnet is a permanent magnet and is configured to provide a constant magnetic field in the speaker. The pole piece is located in the groove of the U-yoke and is connected to a surface on a side of the second magnet close to the diaphragm, and a magnetic gap is formed between the pole piece and the side wall of the groove of the U-yoke. The pole piece may have a function of magnetic conduction.

Optionally, the second magnet and the pole piece are cylinders, and an axis of the second magnet and an axis of the pole piece are overlapped with an axis of the U-yoke. The axis of the coil is overlapped with the axis of the U-yoke. The axis of the U-yoke may be used as the axis of the magnetic assembly. In this case, the axis of the second magnet at an initial position, an axis of an inner hole of the pole piece at an initial position, and the axis of the coil at the initial position may be overlapped. This is helpful to enable the axis of the coil to keep overlapped with the axis of the magnetic assembly as much as possible during the vibration of the coil.

Optionally, the connecting member has a first step surface. The first step surface is parallel to the bottom of the accommodating cavity, and the outer side of the first damper is bonded to the first step surface. Through the first step surface, a contact area between the outer side of the first damper and the connecting member may be increased, and firmness of the connection between the outer side of the first damper and the connecting member may be improved. In addition, the frame has a second step surface. The second step surface is parallel to the bottom of the accommodating cavity, the outer side of the second damper is attached to the second step surface, and the inner side of the second damper is attached to a surface on a side of the connecting member away from the diaphragm. In this way, by arranging the second step surface, a contact area between the outer side of the second damper and the frame may be increased, and firmness of the connection between the outer side of the second damper and the frame may be improved.

Optionally, the connecting member is connected to the diaphragm, and an end of the coil former close to the diaphragm is connected to an end of the connecting member close to the diaphragm. In this way, since in the vibrating assembly, the coil former is already bonded to the connecting member, in a process of bonding the diaphragm to the vibrating assembly, it is only necessary to bond the diaphragm to the connecting member, so as to simplify a mounting process of the speaker.

Optionally, an end of the coil former close to the diaphragm is connected to the diaphragm, and an end of the connecting member close to the diaphragm is connected to the coil former. In this way, since in the vibrating assembly, the connecting member is already bonded to the coil former, in a process of bonding the diaphragm to the vibrating assembly, it is only necessary to bond the diaphragm to the coil former, so as to simplify a mounting process of the speaker.

Optionally, an end of the coil former close to the diaphragm is connected to the diaphragm, and an end of the connecting member close to the diaphragm is connected to the diaphragm. There is a gap between the end of the coil former close to the diaphragm and the end of the connecting member close to the diaphragm. In this way, the coil former may be connected to the connecting member indirectly through the diaphragm. During the vibration, the coil may drive the coil former to vibrate, and then the coil former drives the connecting member to vibrate, so that the vibration of the coil may be transmitted to the first damper and the second damper that are connected to the connecting member.

Optionally, the speaker further includes a surround. The surround is annular, an inner side of the surround is connected to the diaphragm, and an outer side of the surround is connected to the frame. In this case, a flexible connection between the diaphragm and the frame can be implemented through the surround. In addition, after the speaker is mounted in a mounting hole of a housing of a terminal, air in the housing may be sealed.

Optionally, the surround is sunken in a direction close to the bottom of the accommodating cavity. The sunken surround can avoid interference between the surround and another component outside the speaker, for example, a dust screen. In addition, the diaphragm is bulged in a direction away from the bottom of the accommodating cavity. In this way, a shape of the diaphragm may be coupled to a radiation shape of a sound wave, so that radiation of the sound wave is more uniform.

According to another aspect of this application, a terminal is provided, including a housing and any speaker described above. The housing is provided with a mounting hole, and a part of the speaker is located in the mounting hole. The foregoing terminal has the same technical effects as the speaker provided in the foregoing embodiment. Details are not described herein again.

Optionally, the foregoing terminal is one of a sound box, a television, or a computer. The sound box, the television, or the computer has the same technical effects as the speaker provided in the foregoing embodiment. Details are not described herein again.

REFERENCE NUMERALS

01: sound box; 02: housing; 03: mounting hole; 10: speaker; 100: accommodating cavity; A1: bottom of the accommodating cavity; A2: side wall of the accommodating cavity; 20: frame; 30: diaphragm; 31: surround; 40: magnetic assembly; 401: T-yoke; 402: first magnet; 403: washer; 404: U-yoke; 414: bottom of a groove of the U-yoke; 424: side wall of the groove of U-yoke; 405: second magnet; 406: pole piece; 400: magnetic gap; 50: vibrating assembly; 51: voice coil; 501: coil; 502: coil former; 503: connecting member; 61: first damper; 62: second damper; 70: damper bracket; 411: base plate; 412: pole post; B1: first step surface; B2: second step surface; and 600: third damper.

DESCRIPTION OF EMBODIMENTS

The following describes the technical solutions in embodiments of this application with reference to the accompanying drawings in the embodiments of this application. It is clear that the described embodiments are merely a part rather than all of the embodiments of this application.

In the following, the terms "first", "second", or the like are merely intended for a purpose of description, and shall not be understood as an indication or implication of relative importance or implicit indication of a quantity of indicated technical features. Therefore, a feature limited by "first", "second", or the like may explicitly or implicitly include one or more features.

In addition, in this application, orientation terms such as "left", "right", "upper", and "lower" are defined relative to schematic placement orientations of components in the accompanying drawings. It should be understood that, these orientation terms are relative concepts and are used for relative description and clarification, and may change correspondingly according to changes in the placement orientations of the components in the accompanying drawings.

In this application, unless otherwise clearly specified and defined, the term "connection" should be understood in a broad sense. For example, the "connection" may be fixed connection, detachable connection, or integrated connection, may be direct connection, or may be indirect connection through an intermediate medium.

Figure 1A:
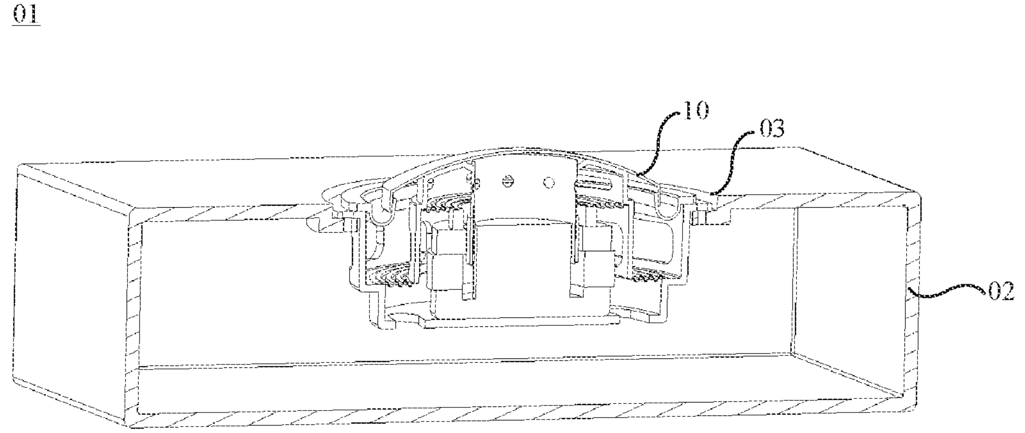
FIG. 1*a* is a schematic diagram of a structure of a sound device according to an embodiment of this application.
Figure 1B:
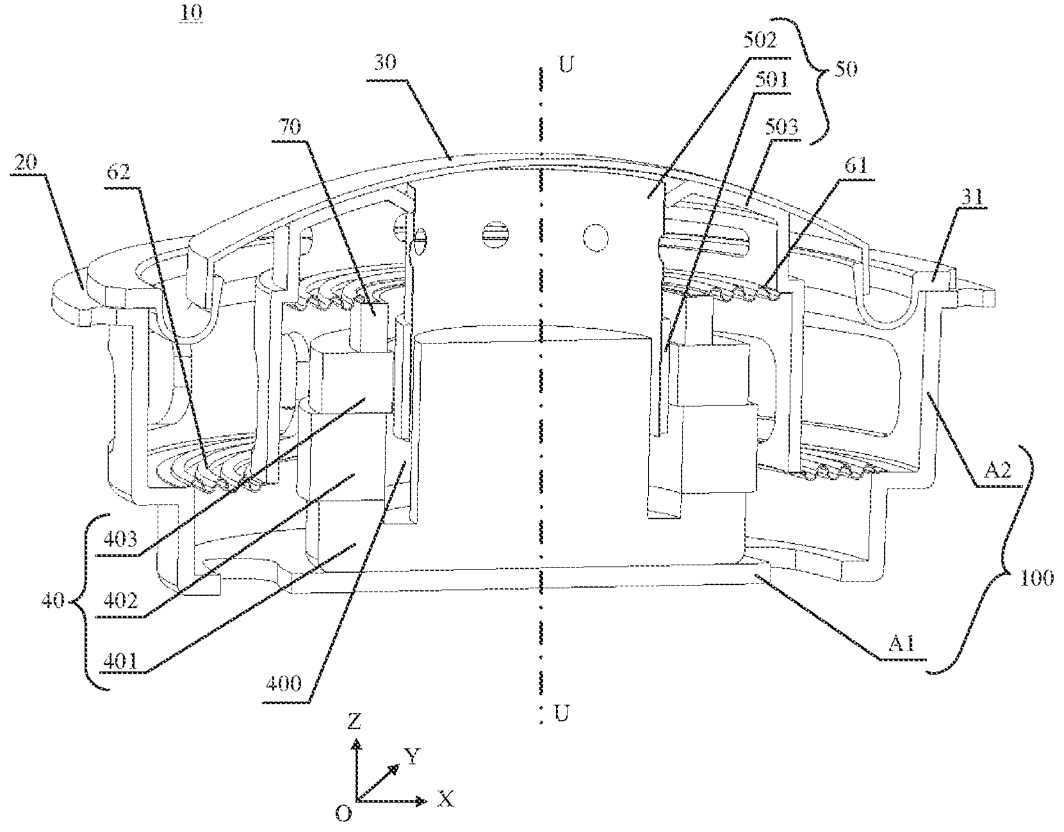
FIG. 1B is a schematic diagram of a structure of a speaker in FIG. 1*a;*

An embodiment of this application provides a terminal. The terminal may be a television, a computer, a vehicle-mounted device, a sound box, or the like. The terminal is provided with a sound box 01 shown in FIG. 1*a*. The sound box 01 may include a housing 02 and a speaker 10. The housing 02 is provided with a mounting hole 03. A part of the speaker 10 is arranged in the mounting hole 03. In some embodiments of this application, as shown in FIG. 1*b*, the speaker 10 may include a frame 20, a diaphragm 30, a magnetic assembly 40, a vibrating assembly 50, a first damper 61, and a second damper 62. When the speaker 10 is mounted in the mounting hole 03 of the housing 02, the diaphragm 30 is located outside the housing 02.

Figure 2:
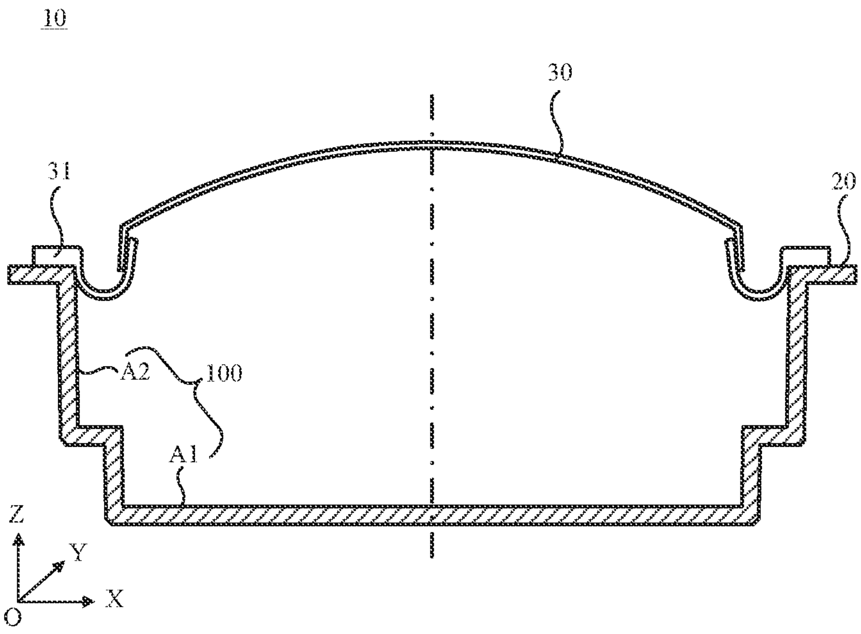
FIG. 2 is a schematic diagram of a partial structure of the speaker shown in FIG. 1*a;*
Figure 3:
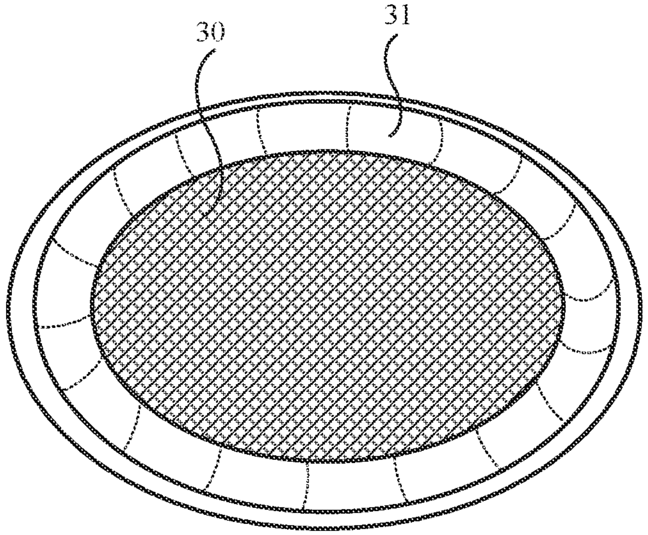
FIG. 3 is a schematic diagram of structures of a diaphragm and a surround in FIG. 2.

The frame 20 is provided with a concave accommodating cavity 100 shown in FIG. 2. In the accommodating cavity 100, a part parallel to an XOY plane is a bottom A1 of the accommodating cavity 100, and a part intersecting with the XOY plane is a side wall A2 of the accommodating cavity 100. The side wall A2 is arranged around the bottom A1. In addition, the diaphragm 30 covers an opening of the accommodating cavity 100 and is connected to the frame 20. In some embodiments of this application, the speaker 10 may further include a surround (surround) 31 of an annular structure, which may also be referred to as a folded ring. As shown in FIG. 3, the surround 31 is nested around the diaphragm 30. As shown in FIG. 2, an inner side of the surround 31 is bonded to a periphery of the diaphragm 30, and an outer side of the surround 31 is bonded to the frame 20, so that the diaphragm 30 may be connected to the frame 20 through the surround 31.

A material of the diaphragm 30 is not limited in this application. For example, the material may be at least one of a paper material, plastics, metal, or fiber. In addition, the surround 31 is prepared from an elastic material, for example, a rubber material. A texture of the surround 31 is softer than that of the diaphragm 30. In this case, a flexible connection between the diaphragm 30 and the frame 20 may be implemented through the surround 31. In addition, after the speaker 10 is mounted in the mounting hole 03 of the housing 02 shown in FIG. 1*a*, air in the housing 02 may be sealed.

In some embodiments of this application, as shown in FIG. 2, the surround 31 may be sunken in a direction close to the bottom A1 of the accommodating cavity 100. The sunken surround 31 can avoid interference between the surround 31 and another component outside the speaker 10, for example, a dust screen. Alternatively, in some other embodiments of this application, the surround 31 may be bulged in a direction away from the bottom A1 of the accommodating cavity 100. Compared with the sunken surround 31, the bulged surround 31 may provide a stronger thrust force for the diaphragm 30. In addition, as shown in FIG. 2, the diaphragm 30 may be bulged in the direction away from the bottom A1 of the accommodating cavity 100. In this way, a shape of the diaphragm 30 may be coupled to a radiation shape of a sound wave, so that radiation of the sound wave is more uniform. Alternatively, in some other embodiments, the diaphragm 30 may be sunken in the direction close to the bottom A1. Compared with the bulged diaphragm 30, the sunken diaphragm 30 may have a higher intensity and is more prone to vibration, so that the speaker 10 can cover a wider sound frequency. Moreover, the sunken diaphragm 30 can avoid interference with another component outside the speaker 10.

Shapes of the surround 31 and the diaphragm 30 are not limited in this application. For the convenience of description, the following provides descriptions by using an example in which the diaphragm 30 is bulged in the direction away from the bottom A1 of the accommodating cavity

100 and the surround 31 is sunken in the direction close to the bottom A1 of the accommodating cavity 100.

In addition, as shown in FIG. 1B, the magnetic assembly 40 is arranged in the accommodating cavity 100 and is connected to the bottom A1 of the accommodating cavity 100. An end of the magnetic assembly 40 close to the diaphragm 30 has a magnetic gap 400. In some embodiments of this application, the magnetic assembly 40 may include a T-yoke 401, a first magnet 402, and a washer 403 that are sequentially away from the bottom A1 of the accommodating cavity 100.

It should be noted that FIG. 1B shows a cross-sectional structure of the speaker 10 (the speaker is sectioned in a direction perpendicular to the bottom A1 of the accommodating cavity 100). The cross-sectional structure of the speaker 10 is bilaterally symmetrical with respect to an axis U-U of the magnetic assembly 40. For some components in the accompanying drawings, for example, the magnetic assembly, a mark "40" is labeled on a left part of the magnetic assembly, but is not labeled on a right part of the magnetic assembly. However, since the structure of the magnetic assembly is bilaterally symmetrical with respect to the axis U-U, the right part with no labeled mark also belongs to the structure of the magnetic assembly. In all accompanying drawings provided in embodiments of this application, a labeling mode of a component bilaterally symmetrical with respect to the axis U-U of the magnetic assembly 40 may be implemented in a similar way. Details are not described herein again.

Figure 4A:
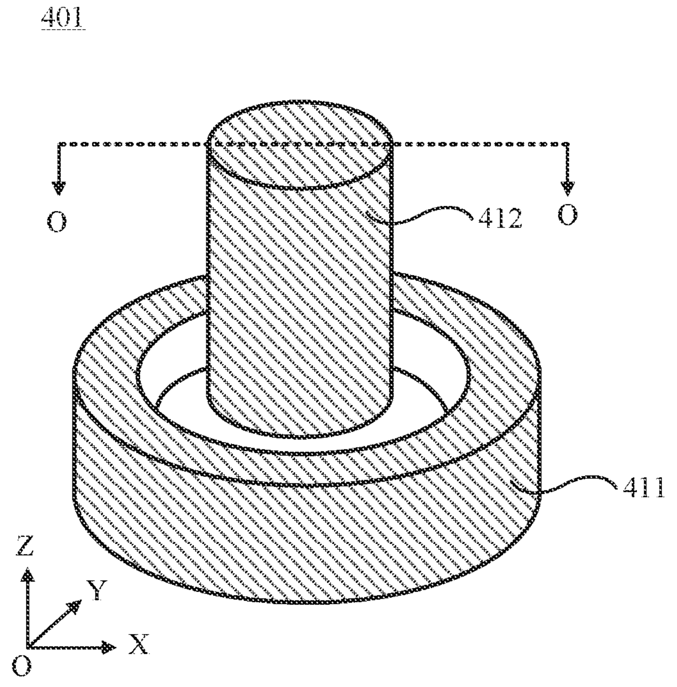
FIG. 4*a* is a schematic diagram of a structure of a T-yoke in FIG. 1B.

A material of the T-yoke 401 may be iron with relatively high purity. As shown in FIG. 4*a*, the T-yoke 401 may include a base plate 411 parallel to an XOY plane and a pole post 412 perpendicular to the XOY plane. The base plate 411 and the pole post 412 are made of a same material and are of an integrated structure. In a process of manufacturing the T-yoke 401, the base plate 411 and the pole post 412 may be manufactured simultaneously by using a same manufacturing process.

A cross-sectional view, obtained by sectioning alone a dotted line OO in FIG. 4*a*, of the T-yoke 401 is shown in FIG. 1*b*. It can be seen that a cross-sectional shape of the T-yoke 401 may be approximate to an inverted shape. In this case, the base plate 411 is connected to the bottom A1 of the accommodating cavity 100 through bonding, and the pole post 412 integrated with the base plate 411 is located on a side of the base plate 411 close to the diaphragm 30.

It should be noted that the bonding mode in embodiments of this application may be bonding, by using liquid glue or by using a solid bonding layer, two components that need to be bonded to each other.

Figure 4B:
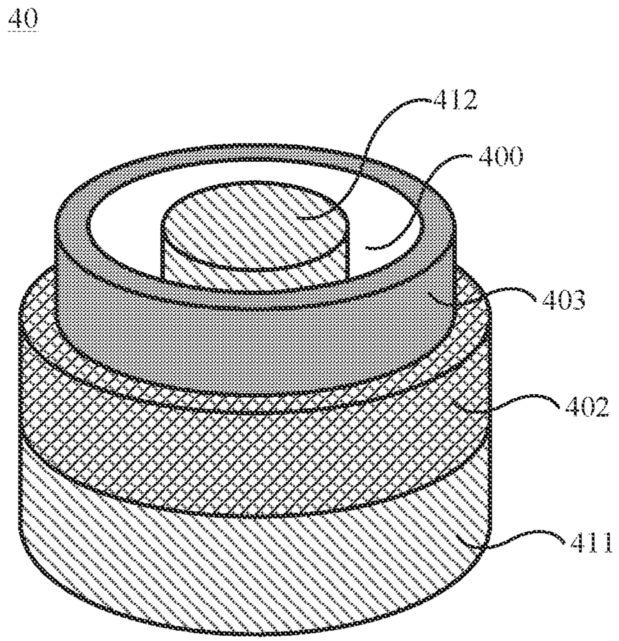
FIG. 4*b* is a schematic diagram of a structure of a magnetic assembly in FIG. 1*b;*
Figure 5:
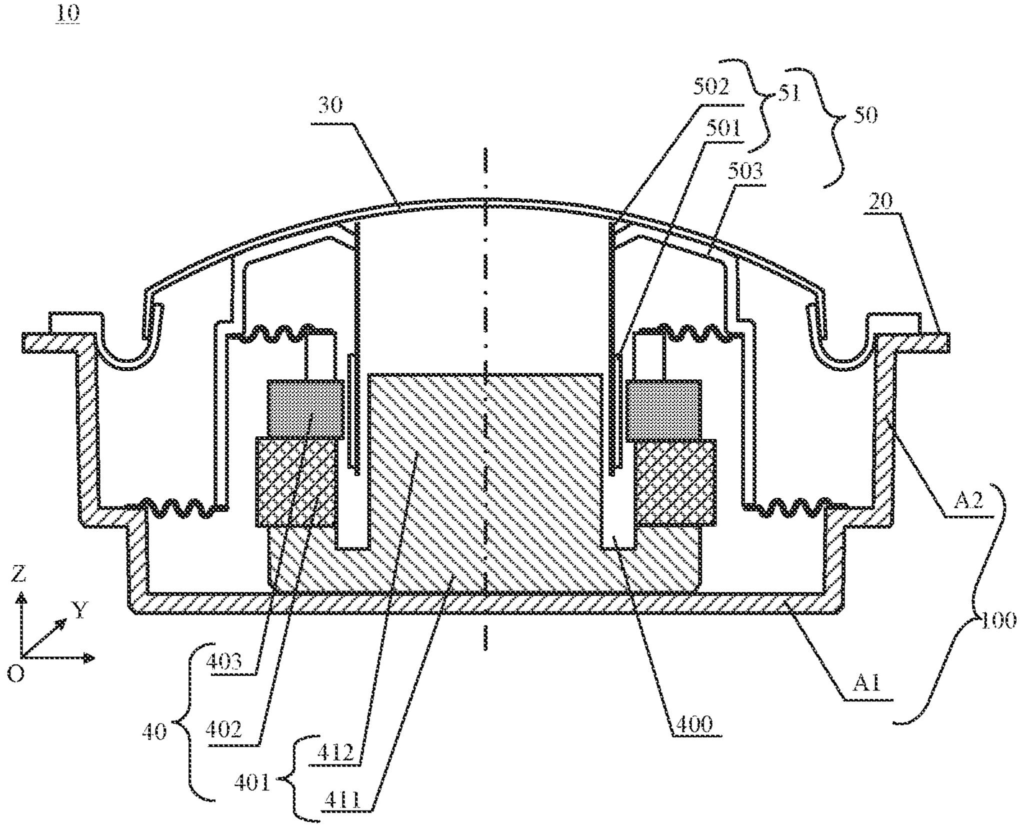
FIG. 5 is a schematic diagram of a structure of a speaker according to an embodiment of this application.

In addition, as shown in FIG. 4*b*, the first magnet 402 and the washer 403 in the magnetic assembly 40 may be both annular and are sequentially stacked on the base plate 411 in a direction away from the base plate 411 of the T-yoke, and the first magnet 402 may be connected to a surface on the side of the base plate 411 of the T-yoke close to the diaphragm 30 (as shown in FIG. 5) through bonding. The washer 403 may be connected to a surface on a side of the first magnet 402 close to the diaphragm 30 through bonding. In this way, the pole post 412 of the T-yoke can pass through inner holes of the annular first magnet 402 and washer 403, and the magnetic gap 400 is formed between the pole post 412 and the washer 403. The first magnet 402 is a permanent magnet and is configured to provide a constant magnetic field in the speaker 10. The washer 403 may be prepared from low carbon steel, and has functions of magnetic conduction and reduction of magnetic resistance.

In this way, under an action of magnetic conduction of the T-yoke 401 and the washer 403, a magnetic line emitted from an N pole of the first magnet 402 can pass through the T-yoke 401, pass through the magnetic gap 400, and then return to an S pole of the first magnet 402, thereby forming a magnetic loop in the magnetic assembly 40. Alternatively, a magnetic line emitted from an N pole of the first magnet 402 can pass through the magnetic gap 400, pass through the T-yoke 401, and then return to an S pole of the first magnet 402, thereby forming a magnetic loop in the magnetic assembly 40.

It should be noted that when the magnetic assembly 40 includes the T-yoke 401, the first magnet 402, and the washer 403, the axis U-U of the magnetic assembly 40 may be an axis of the pole post 412 in the T-yoke 401. Based on this, in some embodiments of this application, an axis of the inner hole of the first magnet 402 and an axis of the inner hole of the washer 403 may be overlapped with the axis of the pole post 412, thereby generating a relatively high magnetic field intensity.

In addition, as shown in FIG. 5 (a cross-sectional view of the speaker 10 in FIG. 1B), the vibrating assembly 50 in the speaker 10 is located in the accommodating cavity 100 and is connected to the diaphragm 30, and the vibrating assembly 50 is configured to drive the diaphragm 30 to vibrate up and down in a direction perpendicular to the bottom A1 of the accommodating cavity 100 (for example, a Z direction). The vibrating assembly 50 may include a coil 501, a coil former 502, and a connecting member 503. The connecting member 503 is arranged on a side (an outer side) of the coil former 502 close to the side wall A2 of the accommodating cavity 100.

The coil former 502 shown in FIG. 5 may be of a cylindrical structure made of aluminum metal, fiberglass, or another rigid material. The coil 501 may be an enameled wire wound around a surface (an outer surface) of a side of the coil former 502 away from the pole post 412 of the T-yoke 401. The coil former 502 is used as a part of the vibrating assembly 50 to carry the coil 501. Moreover, a part wound with the coil 501 in the coil former 502 is located in the magnetic gap 400 to secure the coil 501. As a result, when a magnetic line generated in the magnetic assembly 40 passes through the magnetic gap 400, the magnetic line may pass through the coil 501, so that the energized coil 501 may vibrate under an action of a magnetic field, An assembly composed of the coil 501 and the coil former 502 may be referred to as a voice coil 51.

In some embodiments of this application, as shown in FIG. 5, an end of the coil former 502 close to the diaphragm 30 may be connected to an end of the connecting member 503 close to the diaphragm 30 through bonding. Then, the diaphragm 30 is connected to the connecting member 503 through bonding, so that the entire vibrating assembly 50 can be connected to the diaphragm 30. In this way, since in the vibrating assembly 50, the coil former 502 is already bonded to the connecting member 503, in a process of bonding the diaphragm 30 to the vibrating assembly 50, it is only necessary to bond the diaphragm 30 to the connecting member 503, so as to simplify a mounting process of the speaker 10.

Figure 6A:
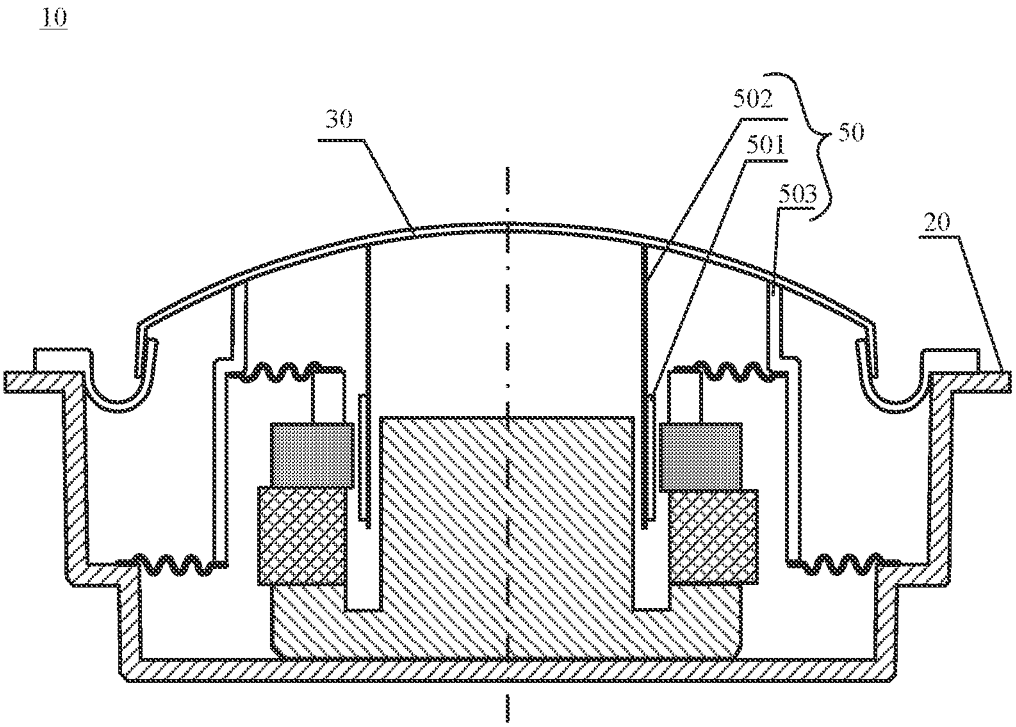
FIG. 6*a* is a schematic diagram of another structure of a speaker according to an embodiment of this application.

Alternatively, in some other embodiments of this application, as shown in FIG. 6*a*, an end of the coil former 502 close to the diaphragm 30 is connected to the diaphragm 30 through bonding, and an end of the connecting member 503 close to the diaphragm 30 is connected to the diaphragm 30 through bonding, so that the entire vibrating assembly 50 can be connected to the diaphragm 30. Moreover, there is a gap between the end of the coil former 502 close to the diaphragm 30 and the end of the connecting member 503 close to the diaphragm 30.

Figure 6B:
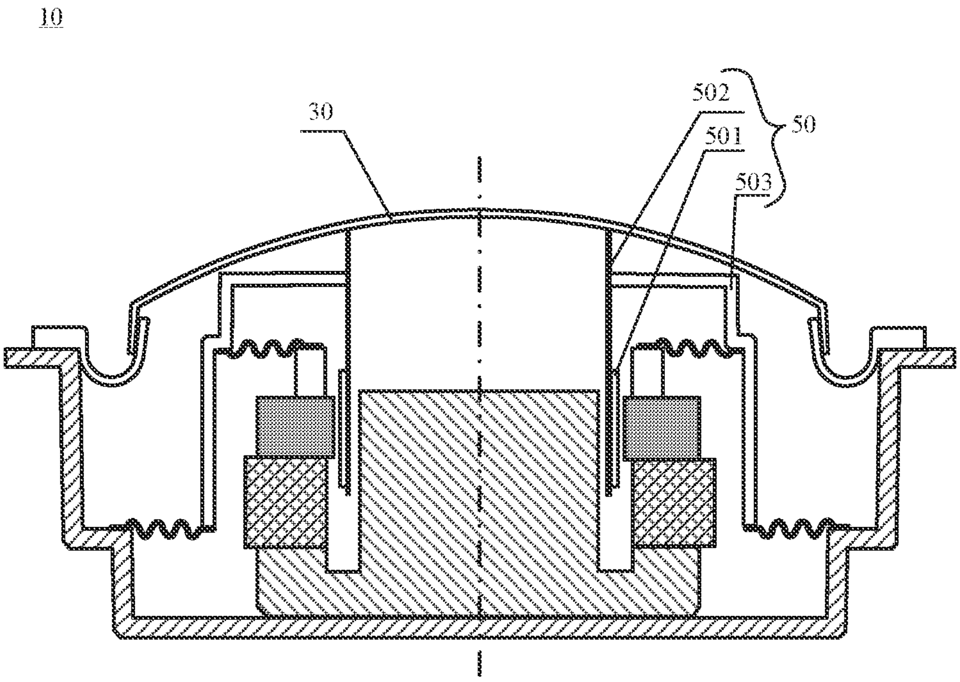
FIG. 6*b* is a schematic diagram of another structure of a speaker according to an embodiment of this application.

Alternatively, in some other embodiments of this application, as shown in FIG. 6*b*, an end of the coil former 502 close to the diaphragm 30 is connected to the diaphragm 30 through bonding, and an end of the connecting member 503 close to the diaphragm 30 is connected to the coil former 502, so that the entire vibrating assembly 50 can be connected to the diaphragm 30.

A connection manner between the vibrating assembly 50 and the diaphragm 30 is not limited in this application. For the convenience of description, the following provides descriptions by using an example shown in FIG. 5 in which the end of the connecting member 503 close to the diaphragm 30 is connected to the diaphragm 30 and the coil former 502 is connected to the connecting member 503.

Figure 7A:
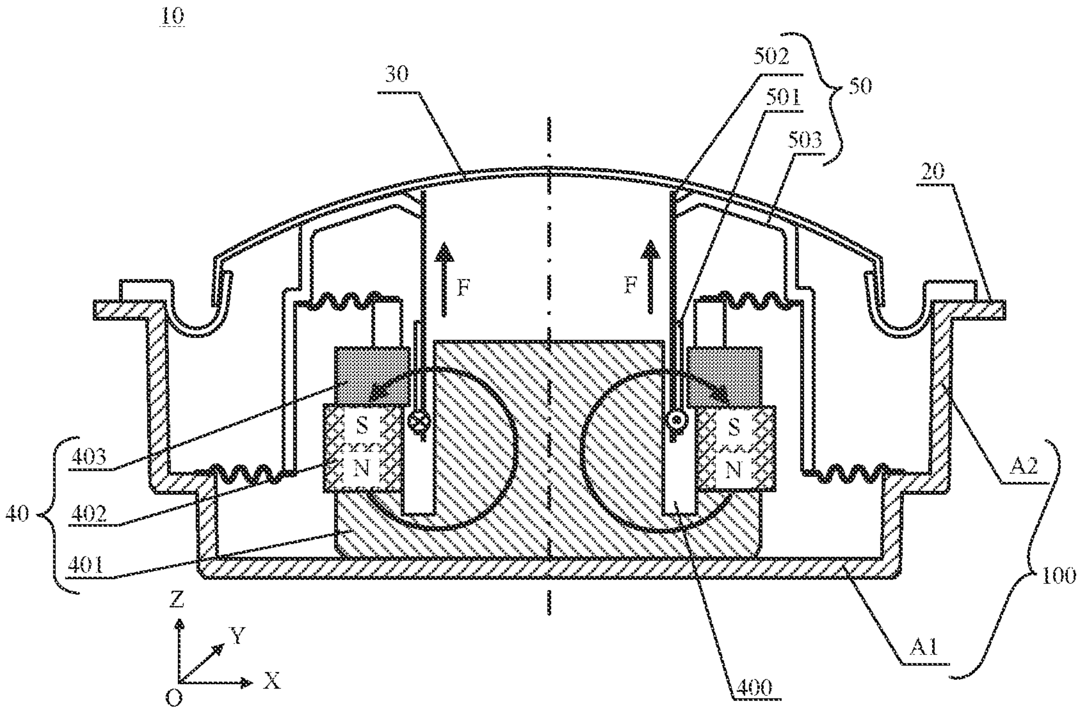
FIG. 7*a* is a schematic diagram of a working status of a speaker according to an embodiment of this application.

Based on this, during the operation of the speaker 10, as shown in FIG. 7*a*, when a current is introduced to the coil 501 located in the magnetic gap 400, the coil 501 generates an acting force in a Z direction (perpendicular to the XOY plane, that is, the bottom A1 of the accommodating cavity 100) under an action of a Lorentz effect.

For example, an end of the first magnet 402 close to the bottom A1 of the accommodating cavity 100 may be an N pole, and an end of the first magnet 402 close to the diaphragm 30 may be an S pole. A direction of the current introduced to the coil 501 is shown in FIG. 7*a* When the current enters from a left end of a cross section of the coil 501 (represented by "ⓧ") and comes out from a right end of the cross section of the coil 501 (represented by "⊙"), according to the left-hand rule, it can be learned that a direction of a Lorentz force F suffered by the coil 501 located in the magnetic gap 400 under an action of a magnetic field provided by the magnetic assembly 40 may be an upward direction perpendicular to the bottom A1 of the accommodating cavity 100 (a direction close to the diaphragm 30). In this way, the coil 501 drives the entire vibrating assembly 50 to push the diaphragm 30 upward.

In addition, a direction of a current introduced to the coil 501 is shown in FIG. 7*h*. When the current enters from the right end of the cross section of the coil 501 (represented by "ⓧ") and comes out from the left end of the cross section of the coil 501 (represented by "⊙"), according to the left-hand rule, it can be learned that a direction of a Lorentz force F suffered by the coil 501 located in the magnetic gap 400 under an action of a magnetic field provided by the magnetic assembly 40 may be a downward direction perpendicular to the bottom A1 of the accommodating cavity 100 (a direction away from the diaphragm 30). In this way, the coil 501 may drive the entire vibrating assembly 50 to pull the diaphragm 30 downward.

Based on this, by changing the direction of the current in the coil 501, the diaphragm 30 may move up and down in a direction perpendicular to the bottom A1 of the accommodating cavity 100 (Z direction) under a vibrating action of the vibrating assembly 50. During the vibration, the diaphragm 30 may drive the air outside the housing 02 of the terminal 01 to vibrate to generate sound.

Figure 7B:
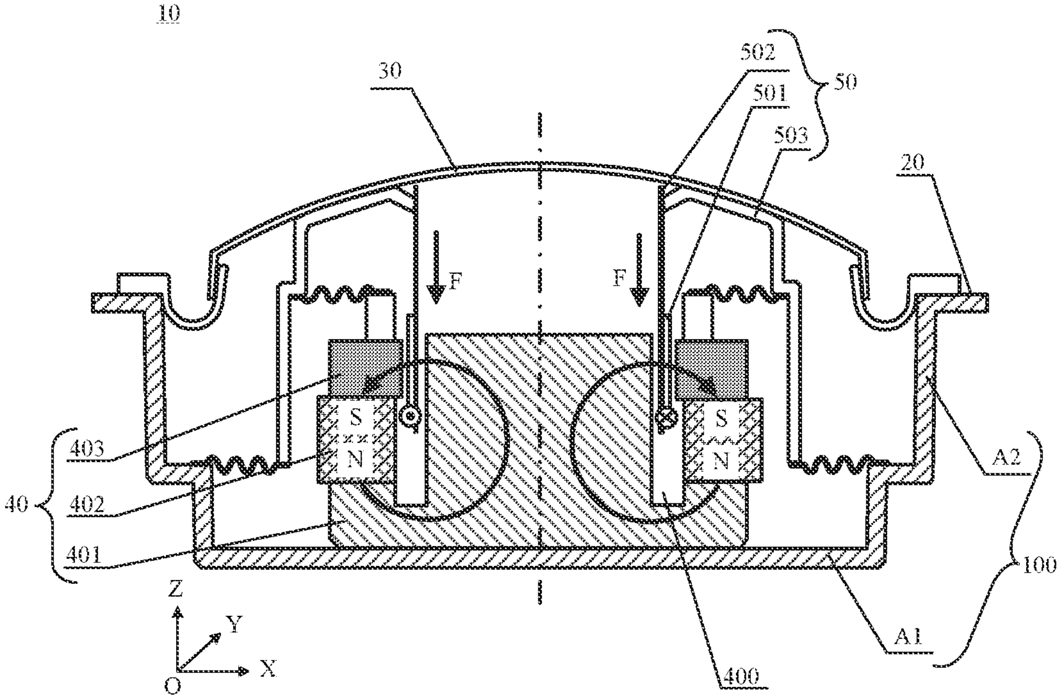
FIG. 7*b* is a schematic diagram of another working status of a speaker according to an embodiment of this application.

It should be noted that in FIG. 7*a* and FIG. 7*b*, the description is provided by using the example in Which the end of the first magnet 402 close to the bottom A1 of the accommodating cavity 100 is used as an N pole and the end of the first magnet 402 close to the diaphragm 30 is used as an S pole. In some other embodiments of this application, the end of the first magnet 402 close to the bottom A1 of the accommodating cavity 100 may be an S pole, and the end of the first magnet 402 close to the diaphragm 30 may be an N pole. In this case, a process in which the diaphragm 30 pushes air to generate sound under the vibrating action of the vibrating assembly 50 may be implemented in a similar way. Details are not described herein again.

In addition, it can be learned from the foregoing that the coil 501 vibrates up and down under an action of the magnetic field in the magnetic gap 400 after being energized. When the coil 501 is not energized, the coil 501 does not vibrate. In this case, other components (the coil former 502 and the connecting member 503) of the vibrating assembly 50 connected to the coil 501 and the diaphragm 30 connected to the vibrating assembly 50 are all in a stationary state, so that they are located at respective initial positions.

Figure 8:
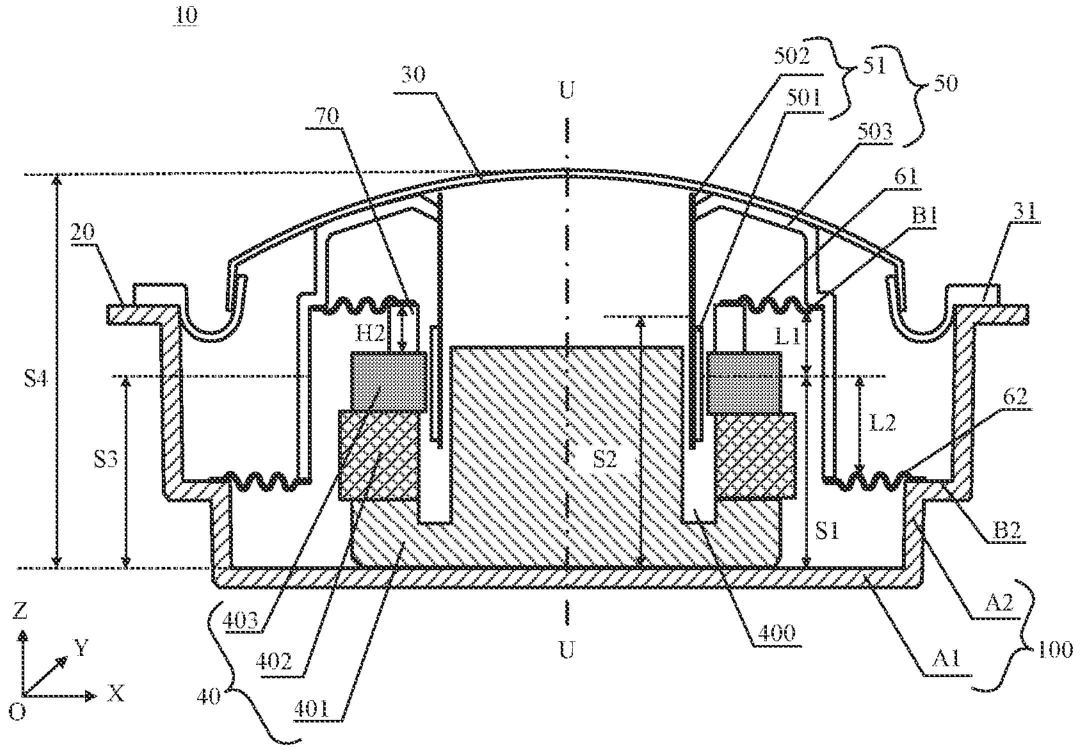
FIG. 8 is a schematic diagram of another structure of a speaker according to an embodiment of this application.

For example, as shown in FIG. 8, an initial position of the coil 501 means that an axis of the coil 501 in a stationary stale is overlapped with or approximately overlapped with the axis U-U of the magnetic assembly 40. Moreover, in a Z direction (perpendicular to the bottom A1 of the accommodating cavity 100), there is a first initial spacing S1 between a geometric center of the coil 501 and the bottom A1 of the accommodating cavity 100. An initial state of the coil former 502 means that an axis of the coil former 502 in a stationary state is overlapped with or approximately overlapped with the axis UW of the magnetic assembly 40. Moreover, in the Z direction, there is a second initial spacing S2 between a geometric center of the coil former 502 and the bottom A1 of the accommodating cavity 100. An initial state of the connecting member 503 means that an axis of the connecting member 503 in a stationary state is overlapped with or approximately overlapped with the axis U-U of the magnetic assembly 40. Moreover, in the Z direction, there is a third initial spacing S3 between a geometric center of the connecting member 503 and the bottom A1 of the accommodating cavity 100. Therefore, when the coil 501, the coil former 502, and the connecting member 503 in the vibrating assembly 50 are all in respective initial states, the axis of the coil 501 is overlapped with the axis of the coil former 502, and the axis of the connecting member 503 is overlapped with the axis of the coil former 502.

In addition, an initial state of the diaphragm 30 means that a geometric center of the diaphragm 30 in a stationary state is overlapped with or approximately overlapped with a vertical projection of the axis U-U of the magnetic assembly 40 on the diaphragm 30. Moreover, in the Z direction, there is a fourth initial spacing S4 between the geometric center of the diaphragm 30 and the bottom A1 of the accommodating cavity 100. Based on this, in a process in which the coil 501 moves in a direction perpendicular to the bottom A1 of the accommodating cavity 100, to prevent the coil 501 from swinging left and right in a horizontal direction (on an XOY plane shown in FIG. 7*b*, that is, a plane on which the bottom A1 of the accommodating cavity 100 is located), the speaker 10 provided in embodiments of this application further includes a first damper 61 and a second damper 62 that are shown in FIG. 8 and that are located in the accommodating cavity 100.

Figure 9:
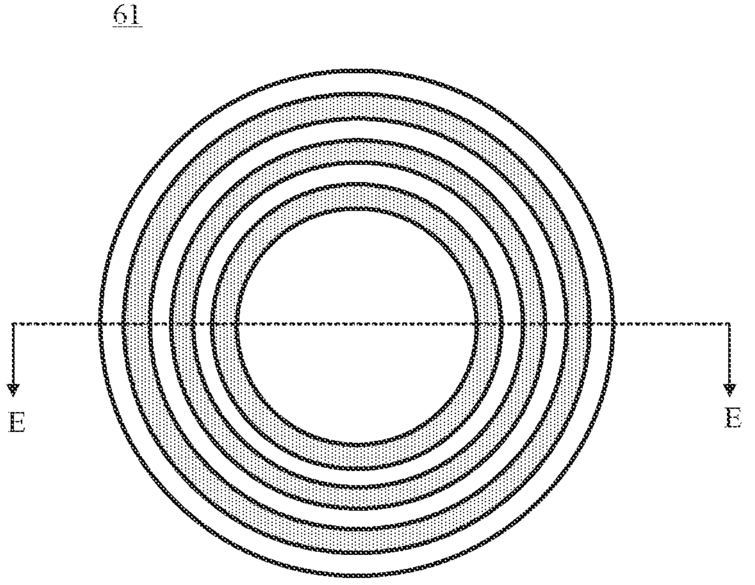
FIG. 9 is a schematic diagram of a top-view structure of a first damper or a second damper in FIG. 8.

In some embodiments of this application, the first damper 61 (or the second damper 62) may be of an annular structure shown in FIG. 9, After sectioning along a dotted line EE in FIG. 9 is performed, the structure of the first damper 61 (or the second damper 62 includes a plurality of uneven ripple structures, as shown in FIG. 8 or FIG. 1B. If there are a larger quantity of ripple structures, depths of ripples are smaller, a material for preparing the damper is thinner, and the damper has greater compliance. Compliance of the first damper 61, the second damper 62, and the surround 31 may together form vibration compliance of the entire speaker 10. The material for preparing the damper may be cotton cloth, polyester fiber cloth, blended fabric, or another material that has relatively high tensile strength and good fatigue resistance and that is not easy to become brittle.

As shown in FIG. 8, when the coil 501 is located at the initial position thereof, the first damper 61 may be arranged close to an upper end of the coil 501 (an end of the coil 501 close to the diaphragm 30) and away from a lower end of the coil 501 (an end of the coil 501 away from the diaphragm 30). The second damper 62 may be arranged close to the lower end of the coil 501 and away from the upper end of the coil 501, In addition, the first damper 61 and the second damper 62 are both connected to the connecting member 503.

In this case, in a process in which the coil 501 is energized to drive the coil former 502 to vibrate up and down, since the coil former 502 may be directly connected to the connecting member 503, or the coil former 502 may be indirectly connected to the connecting member 503 through the diaphragm 30 (as shown in the solution in FIG. 6*a*), the connecting member 503 may vibrate up and down together with the entire voice coil 51 (including the coil 501 and the coil former 502). Based on this, the first damper 61 and the second damper 62 that are connected to the connecting member 503 also vibrate up and down together with the connecting member 503.

In addition, the first damper 61 is provided with a plurality of wave structures in a radial direction of the first damper 61. The second damper 62 is provided with a plurality of wave structures in a radial direction of the second damper 62. The wave structures may cause elastic deformation of the first damper 61 and the second damper 62 in extension directions of the wave structures (that is, the radial directions of the dampers), thereby providing restoring forces for the coil 501 during the elastic deformation.

Figure 10A:
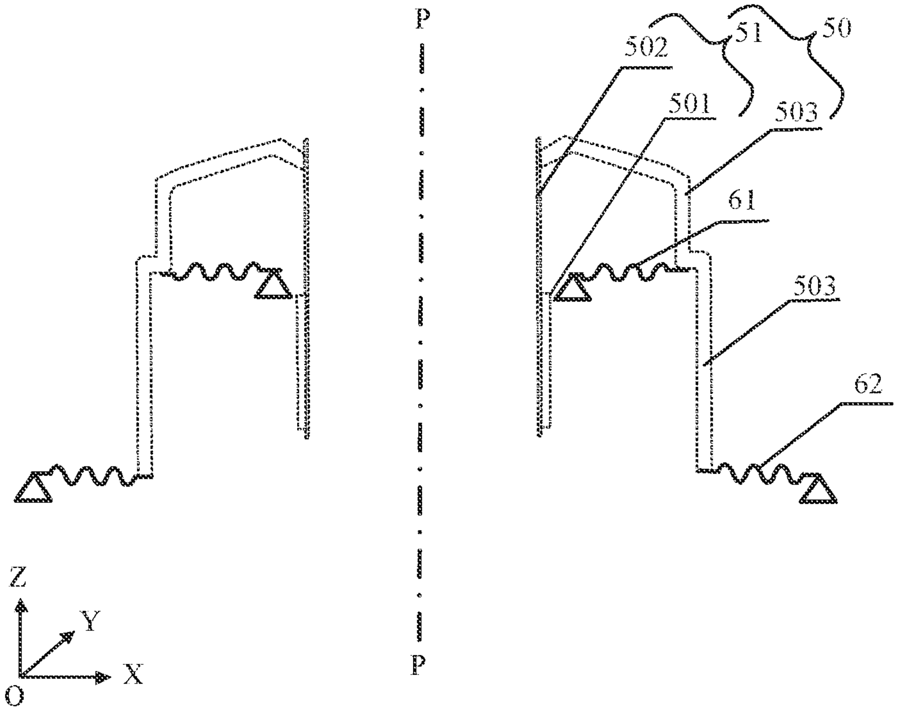
FIG. 10*a* is a schematic diagram of a case in which components in a vibrating assembly in a speaker are located at respective initial positions according to an embodiment of this application.

For example, as shown in FIG. 10*a*, when the coil 501 is not energized, the coil 501, the coil former 502, and the connecting member 503 are all located at respective initial positions (represented by dotted lines). In this case, it can be learned from the foregoing, that the axes of the coil 501, the coil former 502, and the connecting member 503 are all overlapped with or approximately overlapped with the axis U-U of the magnetic assembly. Therefore, the axes of the coil 501, the coil former 502, and the connecting member 503 are overlapped with each other to form an axis P-P of the vibrating assembly 50.

Figure 10B:
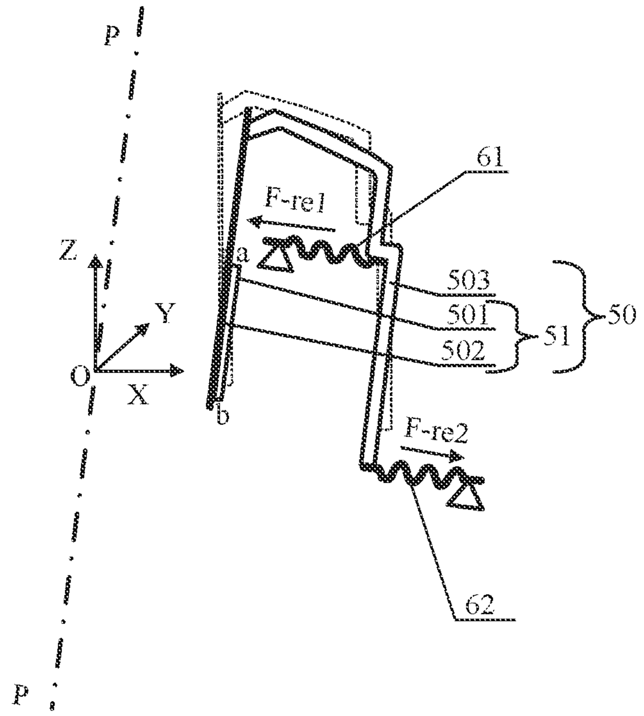
FIG. 10*b* is a schematic diagram of a roll swinging manner of a part of a structure of a vibrating assembly in a speaker according to an embodiment of this application.

The coil 501, the coil former 502, and the connecting member 503 in the vibrating assembly 50 are all bilaterally symmetrical with respect to the axis U-U of the magnetic assembly. The following first uses a right half part of the vibrating assembly 50 as an example for description. As shown in FIG. 10*b*, in some embodiments of this application, in a process in which the coil 501 is energized and vibrates, the voice coil 51 may drive the connecting member 503 to swing to the right, so that the entire vibrating assembly 50 shifts to the right, and the axis P-P of the vibrating assembly 50 shifts to the right from a Z direction (in FIG. 10*b*, respective initial positions of the coil 501, the coil former 502, and the connecting member 503 are represented by dotted lines). In this case, an upper end a of the coil 501 shifts to a right side of the initial position of the coil 501, and a lower end b of the coil 501 shifts to a left side of the initial position of the coil 501. In addition, a part of the connecting member 503 close to the upper end a of the coil 501 shifts to a right side of the initial position of the connecting member 503, and a part of the connecting member 503 close to the lower end b of the coil 501 shifts to a left side of the initial position of the connecting member 503.

In this case, a right haft part of the first damper 61 arranged close to the upper end a of the coil 501 is subjected to elastic deformation under tension. During the elastic deformation, the first damper 61 applies a first restoring force F-re1 leftwards to the part of the connecting member 503 close to the upper end of the coil 501, so that the connecting member 503 drives the upper end a of the coil 501 to move to the left to restore to the initial position of the coil 501.

In addition, the lower end b of the coil 501 shifts to the left side of the initial position of the coil 501 during the swing. In this case, a right half part of the second damper 62 arranged close to the lower end b of the coil 501 is subjected to elastic deformation under tension. During the deformation, the second damper 62 applies a second restoring force F-re2 rightwards to the part of the connecting member 503 close to the lower end b of the coil 501, so that the connecting member 503 drives the lower end b of the coil 501 to move to the right to restore to the initial position of the coil 501.

Figure 10C:
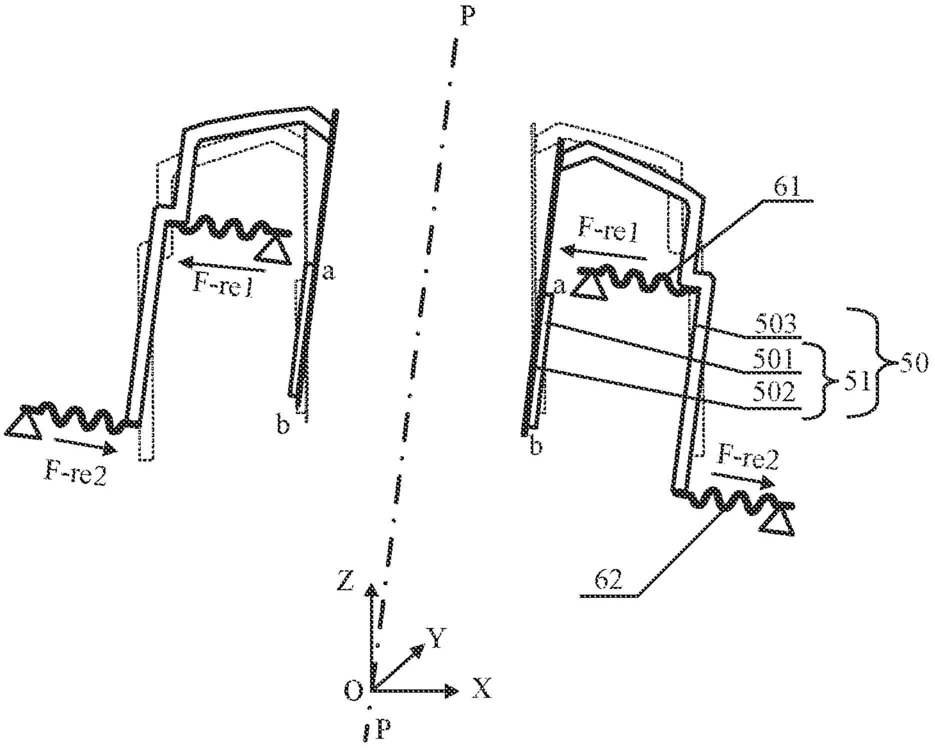
FIG. 10*c* is a schematic diagram of a roll swinging manner of a vibrating assembly in a speaker according to an embodiment of this application.

Since the coil 501, the coil former 502, and the connecting member 503 in the vibrating assembly 50 are all bilaterally symmetrical with respect to the axis U-U of the magnetic assembly, when the entire vibrating assembly 50 shifts to the right, as shown in FIG. 10*c*, a left half part of the vibrating assembly 50 also shifts to the right. Similarly, a left half part of the first damper 61 applies a first restoring force F-re1 leftwards to the part of the connecting member 503 close to the upper end a of the coil 501, so that the connecting member 503 drives the upper end a of the coil 501 to move to the left to restore to the initial position of the coil 501. A left half part of the second damper 62 applies a second restoring force F-re2 rightwards to the part of the connecting member 503 close to the lower end b of the coil 501, so that the connecting member 503 drives the lower end b of the coil 501 to move to the right to restore to the initial position of the coil 501.

In this way, the first damper 61 applies the first restoring force F-re1 leftwards to the part of the connecting member 503 close to the upper end a of the coil 501, and the second damper 62 applies the second restoring force F-re2 rightwards to the part of the connecting member 503 close to the lower end b of the coil 501, so that the connecting member 503 can drive the coil 501 to restore to the initial position of the coil 501 in the process of restoring the initial position of the connecting member 503.

Figure 10D:
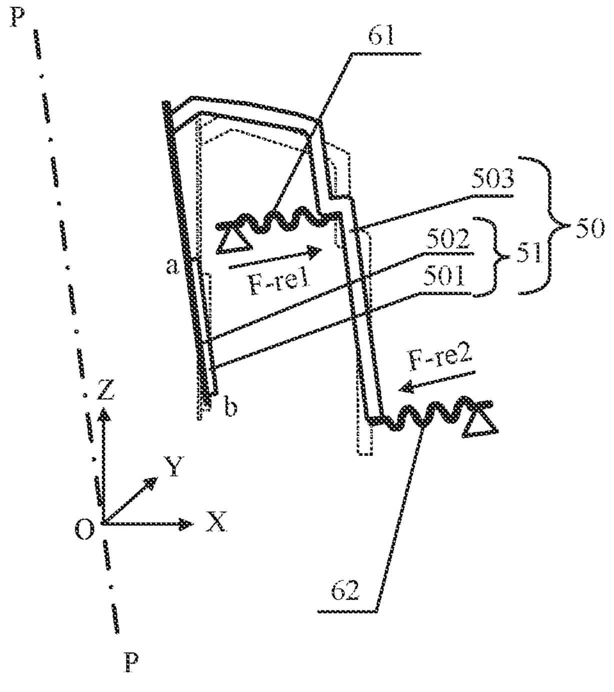
FIG. 10*d* is a schematic diagram of another roll swinging manner of a part of a structure of a vibrating assembly in a speaker according to an embodiment of this application.

The foregoing description is provided by using an example in which the voice coil 51 drives the connecting member 503 to swing to the right in the process in which the coil 501 is energized and vibrates. In some other embodiments of this application, the right half part of the vibrating assembly 50 is used as an example for description. As shown in FIG. 10*d*, during the vibration of the coil 501, the voice coil 51 drives the connecting member 503 to swing to the left, so that the entire vibrating assembly 50 shifts to the left, and the axis P-P of the vibrating assembly 50 shifts to the left from a Z direction (in FIG. 10*d*, respective initial positions of the coil 501, the coil former 502, and the connecting member 503 are represented by dotted lines). In this case, the upper end a of the coil 501 shifts to the left side of the initial position of the coil 501, and the lower end b of the coil 501 shifts to the right side of the initial position of the coil 501. In addition, the part of the connecting member 503 close to the upper end a of the coil 501 shifts to the left side of the initial position of the connecting member 503, and the part of the connecting member 503 close to the lower end b of the coil 501 shifts to the right side of the initial position of the connecting member 503.

In this case, the right half part of the first damper 61 arranged close to the upper end a of the coil 501 is subjected to elastic deformation under pressure. During the elastic deformation, the first damper 61 applies a first restoring force F-re1 rightwards to the part of the connecting member 503 close to the upper end a of the coil 501, so that the connecting member 503 drives the upper end a of the coil 501 to move to the right to restore to the initial position of the coil 501.

In addition, the lower end b of the coil 501 shifts to the right side of the initial position of the coil 501 during the swing. In this case, the right half part of the second damper 62 arranged close to the lower end b of the coil 501 is subjected to elastic deformation under pressure. During the deformation, the second damper 62 applies a second restoring force F-re2 leftwards to the part of the connecting member 503 close to the lower end b of the coil 501, so that the connecting member 503 drives the lower end b of the coil 501 to move to the left to restore to the initial position of the coil 501.

Figure 10E:
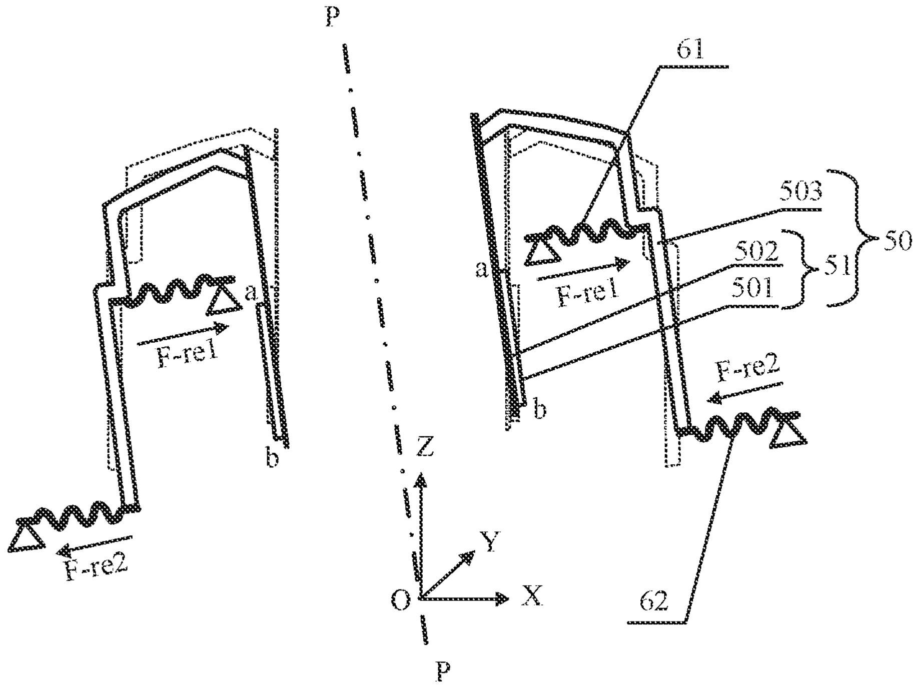
FIG. 10*e* is a schematic diagram of another roll swinging manner of a vibrating assembly in a speaker according to an embodiment of this application.

Similarly, since the coil 501, the coil former 502, and the connecting member 503 in the vibrating assembly 50 are all bilaterally symmetrical with respect to the axis U-U of the magnetic assembly, when the entire vibrating assembly 50 shifts to the left, as shown in FIG. 10*e*, the left half part of the vibrating assembly 50 also shifts to the left. Similarly, the left half part of the first damper 61 applies a first restoring force F-re1 rightwards to the part of the connecting member 503 close to the upper end a of the coil 501, so that the connecting member 503 drives the upper end a of the coil 501 to move to the right to restore to the initial position of the coil 501. The left half part of the second damper 62 applies a second restoring force F-re2 leftwards to the part of the connecting member 503 close to the lower end b of the coil 501, so that the connecting member 503 drives the lower end b of the coil 501 to move to the left to restore to the initial position of the coil 501.

In this way, the first damper 61 applies the first restoring force F-re1 rightwards to the part of the connecting member 503 close to the upper end a of the coil 501, and the second damper 62 applies the second restoring force F-re2 leftwards to the part of the connecting member 503 close to the lower end b of the coil 501, so that the connecting member 503 can drive the coil 501 to restore to the initial position of the coil 501 in the process of restoring the initial position of the connecting member 503.

In conclusion, on one hand, in the process in which the coil 501 swings left and right, the first damper 61 arranged close to the upper end a of the coil 501 may provide, for the upper end a of the coil 501, a first restoring force F-re1 whose direction is opposite to a swing direction of the coil 501. Moreover, the second damper 62 arranged close to the lower end b of the coil 501 may provide, for the lower end of the coil 501, a second restoring force F-re2 whose direction is opposite to the swing direction of the coil 501. Under a combined action of the first restoring force F-re1 and the second restoring force F-re2, the coil 501 can be located close to the initial position of the coil 501 as much as possible, or can be overlapped with the initial position of the coil 501.

It can be learned from the foregoing that during the swing of the coil 501, as shown in FIG. 10*c*, when the upper end a of the coil 501 shifts to the right side (or the left side) of the initial position of the coil 501, the lower end b of the coil 501 shifts to the left side (or the right side) of the initial position of the coil 501. Therefore, the first restoring force F-re1 and the second restoring force F-re2 provided by the first damper 61 and the second damper 62 for the coil 501 are opposite in direction. In this way, the first damper 61 and the second damper 62 can support the vibrating assembly 50 in respective radial directions, so that during the vibration of the coil 501, the axis of the coil 501 can keep overlapped with the axis of the magnetic assembly 40 as much as possible, and the coil 501 can move up and down mainly in the Z direction. As a result, an amplitude of left-right swinging (that is, roll swinging) of the axis of the coil 501 from the Z direction can be reduced. For example, when the speaker 10 operates in a low frequency state and the amplitude of the coil 501 is relatively large under the drive of a high power signal, by reducing the amplitude of the roll swinging of the coil 501, a probability that abnormal sound is caused because the coil 501 is in contact with the washer 403 in the magnetic assembly 40 can be effectively reduced, and a sound distortion rate can be reduced.

On the other hand, by reducing the amplitude of the roll swinging of the coil 501 through the first damper 61 and the second damper 62, compliance of the speaker 10 can also be improved, and a resonance frequency (F0) of the speaker 10 at a low frequency can be reduced, to obtain a better low frequency effect.

Furthermore, since the amplitude of the roll swinging of the coil 501 is reduced under the support action of the first damper 61 and the second damper 62, when the speaker 10 operates in a low frequency state, a size of the magnetic gap 400 required for a large amplitude of the coil 501 may be effectively reduced under the drive of the high power signal. In this way, a small first magnet 402 capable of forming a small-size magnetic gap 400 may be selected in the speaker 10, to reduce a size of the speaker 10, Moreover, a higher magnetic induction intensity may be obtained by using a smaller magnetic gap 400. In this case, when a same current is introduced to the coil 501, the diaphragm 30 can obtain a greater driving force to improve sound production efficiency of the speaker 10.

Based on this, as shown in FIG. 8, the first damper 61 and the second damper 62 may be arranged concentrically. For example, axes of inner rings of the first damper 61 and the second damper 62 may be overlapped with the axis (U-U) of the magnetic assembly 40. In this way, in the process of supporting the coil 501 by the first damper 61 and the second damper 62 that are arranged concentrically, magnitudes of the first restoring force F-re1 applied by the first damper 61 to the coil 501 and the second restoring force F-re2 applied by the second damper 62 to the coil 501 may be the same or approximately the same, so that in a process in which the coil 501 vibrates up and down, the axis of the coil 501 can keep overlapped with the axis (U-U) of the magnetic assembly 40 as much as possible.

Figure 11:
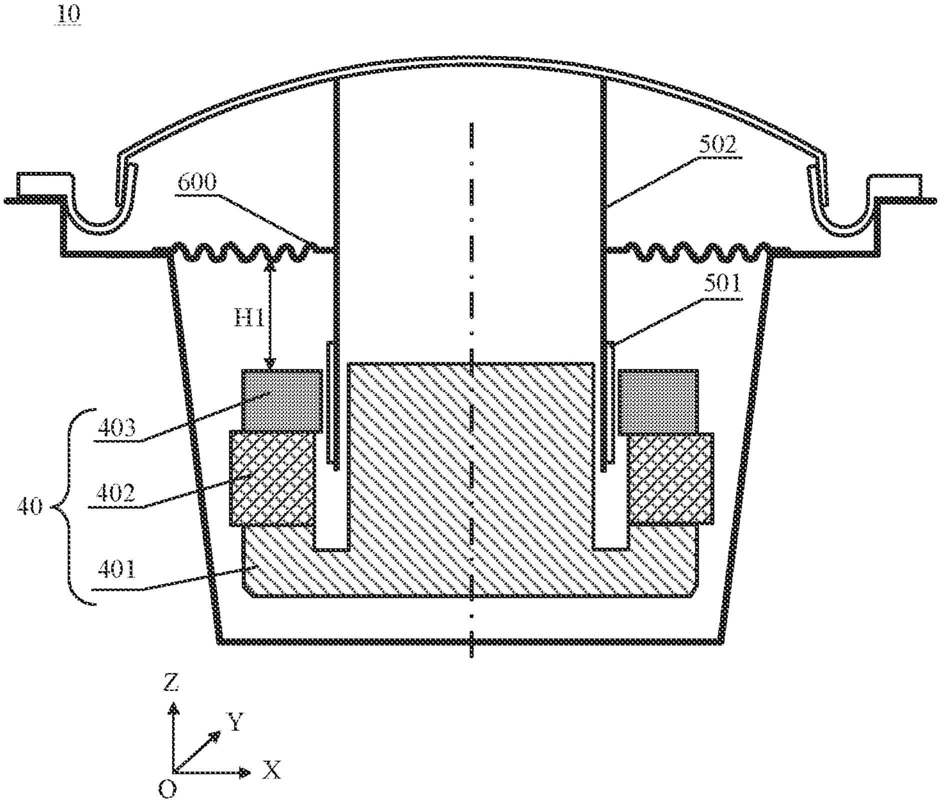
FIG. 11 is a schematic diagram of a structure of a speaker in a related technology.

In addition, in some related technologies, if a third damper 600 is directly connected to the coil former 502, as shown in FIG. 11, since the coil 501 is secured on the coil former 502 and at least a part of the coil 501 is located in the magnetic gap 400 of the magnetic assembly 40, in this case, to prevent the third damper 600 with a relatively large amplitude from touching a component in the magnetic assembly 40 under the drive of a high power signal, a distance between the third damper 600 and the magnetic assembly 40 needs to be increased. In this way, a height (a size in a Z direction) of the coil former 502 connected to the third damper 600 can also be increased. As a result, a thickness (a size in the Z direction) of the entire speaker 10 is increased. In addition, a distance between the first damper 61 and the coil 501 is excessively long, and the support action of the first damper 61 on the coil 501 is weakened.

Compared with the solution shown in FIG. 11, in the speaker 10 provided in an embodiment of this application, as shown in FIG. 8, the first damper 61 and the second damper 62 are both secured on the connecting member 503, and the connecting member 503 is arranged on a side of the coil former 502 close to the side wall A2 of the accommodating cavity 100 (that is, an outer side of the coil former 502). Therefore, the first damper 61 and the second damper 62 are also located on the outer side of the coil former 502. In this way, since the first damper 61 and the second damper 62 do not need to be directly connected to the coil former 502, a height (a size in a Z direction) of the coil former 502 is not increased after the first damper 61 and the second damper 62 are arranged. As a result, a quantity of components stacked above the magnetic assembly 40 can be reduced to reduce a thickness (a size in the Z direction) of the entire speaker 10, so that the speaker 10 can be applied to a sound device with an ultra-thin requirement, namely a large-screen display terminal.

In addition, the first damper 61 and the second damper 62 are arranged on the outer side of the coil former 502. In this way, during the vibration of the first damper 61 and the second damper 62, a probability of interference between the first damper 61 and the second damper 62 and the magnetic assembly 40 located close to the coil former 502 can be reduced. Moreover, the first damper 61 is closer to the upper end of the coil 501 than the second damper 62, and the second damper 62 is closer to the lower end of the coil 501 than the first damper 61, so that roll swinging of both ends of the coil 501 is limited through the first damper 61 and the second damper 62.

Specific arrangement positions of the first damper 61 and the second damper 62 in the speaker 10 are described in detail below.

In some embodiments of this application, as shown in FIG. 8, the first damper 61 may be arranged between the coil former 502 and the connecting member 503, an inner side of the first damper 61 may be connected to the magnetic assembly 40 by using an adhesive, and an outer side of the first damper 61 may be connected to the connecting member 503 by using an adhesive. For example, as shown in FIG. 8, a bent part of the connecting member 503 may be provided with a first step surface B1. The first step surface B1 may be parallel to the bottom A1 of the accommodating cavity 100. The outer side of the first damper 61 may be bonded to the first step surface B1 by using an adhesive, thereby increasing a contact area between the outer side of the first damper 61 and the connecting member 503, and improving firmness of the connection between the outer side of the first damper 61 and the connecting member 503.

It should be noted that in FIG. 8, the description is provided by using an example in which the first step surface B1 faces the bottom A1 of the accommodating cavity 100. In some other embodiments of this application, the first step surface B1 may face the diaphragm 30.

In addition, when the inner side of the first damper 61 is connected to the magnetic assembly 40, to prevent the first damper 61 from touching an upper surface of the washer 403 in the magnetic assembly 40 when the coil 501 vibrates at a large amplitude, the speaker 10 further includes a damper bracket 70 shown in FIG. 8.

The damper bracket 70 is located on a side of the magnetic assembly 40 close to the diaphragm 30, and is connected to the magnetic assembly 40. For example, when the magnetic assembly 40 includes the washer 403, the damper bracket 70 may be located on the upper surface of the washer 403 (that is, a surface of the washer 403 close to the diaphragm 30), and the damper bracket 70 may be connected to the upper surface of the washer 403 by using an adhesive. In addition, a surface on a side of the damper bracket 70 close to the diaphragm 30 may be connected to the inner side of the first damper 61 through bonding.

As shown in FIG. 8, when a vertical projection of the damper bracket 70 on the upper surface of the washer 403 is located in the upper surface of the washer 403, a height H2 (a size in the Z direction) of the damper bracket 70 and an amplitude Ap of the vibrating assembly 50 meet: H2≥Ap. In this way, the first damper 61 may be supported by the damper bracket 70 to prevent the first damper 61 from touching the washer 403 in a process in which the first damper 61 vibrates up and down. Based on this, the damper bracket 70 may be arranged closer to the voice coil 51, thereby increasing a width between an inner ring and an outer ring of the annular first damper 61, and increasing a support force provided by the first damper 61 for the coil 501.

Figure 12:
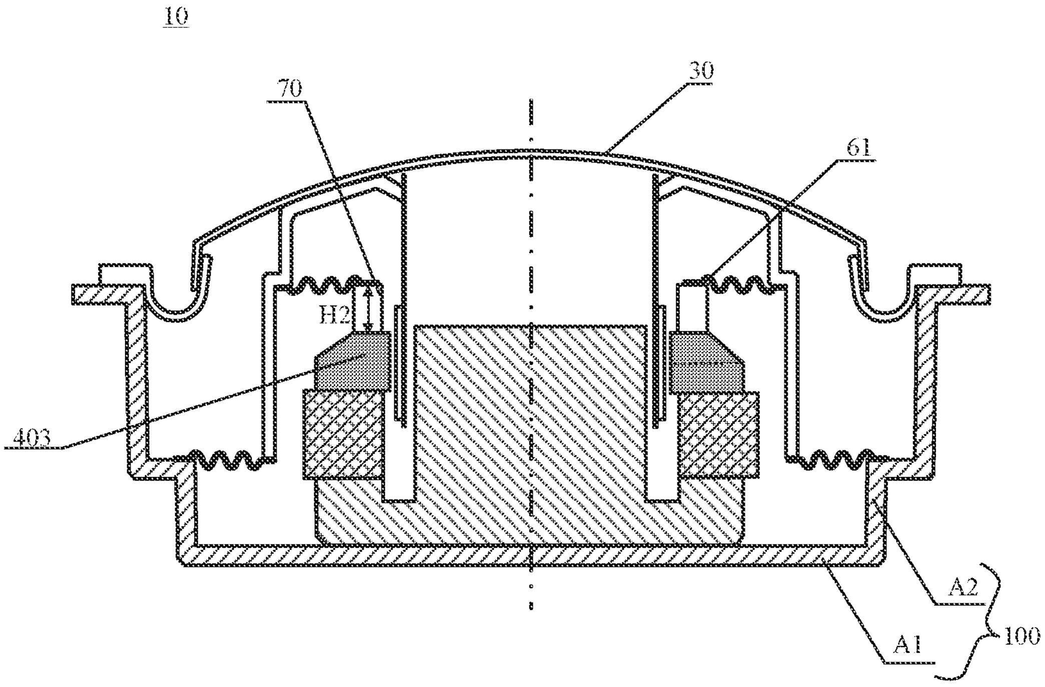
FIG. 12 is a schematic diagram of another structure of a speaker according to an embodiment of this application.

Alternatively, in some other embodiments of this application, as shown in FIG. 12, in a longitudinal section of the washer 403, a part close to the diaphragm 30 (an upper half part) may be a right trapezoid, and a part away from the diaphragm 30 (a lower half part) may be a rectangle. An inclined edge of the right trapezoid is close to the side wall A2 of the accommodating cavity 100. The longitudinal section of the washer 403 is perpendicular to the bottom A1 of the accommodating cavity 100. In this case, on one hand, in the upper half part of the washer 403, a side close to the side wall A2 of the accommodating cavity 100 is an inclined surface (that is, a surface on which the inclined edge of the right trapezoid of the longitudinal section of the washer 403 is located), and the inclined surface may increase a gap between the washer 403 and the first damper 61, so that when an amplitude of the first damper 61 exceeds the height H2 of the damper bracket 70, the first damper 61 does not touch the washer 403 during the vibration. In addition, the part away from the diaphragm 30 in the longitudinal section of the washer 403 is a rectangle. This can avoid damage to the washer 403 caused during processing, assembly, transportation, or the like due to sharp corners at an end of the washer 403 away from the diaphragm 30.

Figure 13:
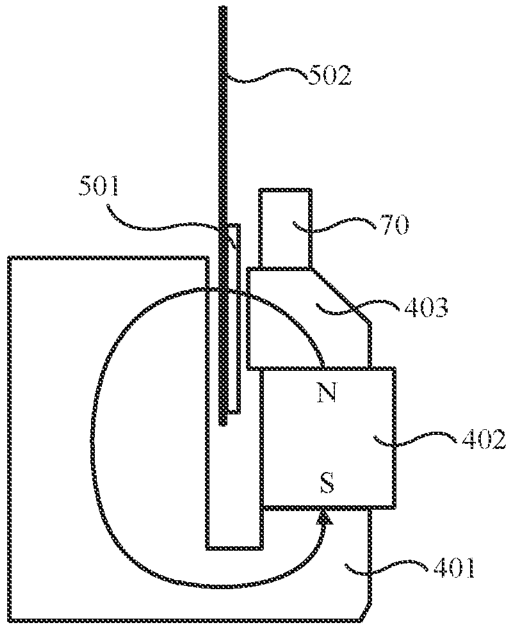
FIG. 13 is a schematic diagram of a magnetic line formed by a magnetic assembly in FIG. 12.

On the other hand, as shown in FIG. 13, when the part close to the diaphragm 30 (the upper half part) in the longitudinal section of the washer 403 is a right trapezoid, and an inclined edge of the trapezoid is located on a side away from the coil 501, materials of a part of the washer 403 close to the coil 501 are more than those of a part of the washer 403 away from the coil 501. In this way, during magnetic conduction, the washer 403 can make magnetic lines (a magnetic line is represented by a solid arrow in FIG. 13) from the first magnet 402 more concentrated towards a side on which the coil 501 is located, so that an intensity of a magnetic field in which the coil 501 is located is higher.

Figure 14:
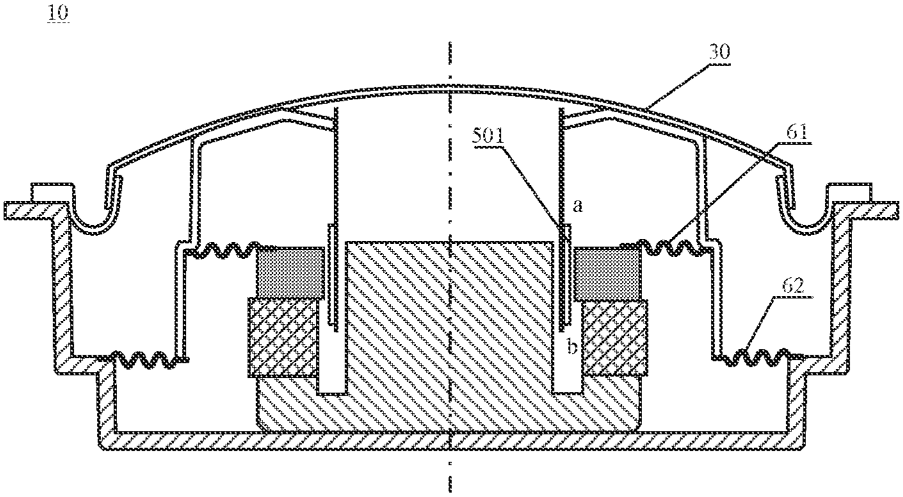
FIG. 14 is a schematic diagram of another structure of a speaker according to an embodiment of this application.

Alternatively, in some other embodiments of this application, when a distance between the magnetic assembly 40 and the connecting member 503 is enough to mount the first damper 61 that meets a design requirement, as shown in FIG. 14, the inner side of the first damper 61 may be directly connected to the surface of the washer 403 close to the diaphragm 30, For the convenience of description, the following provides a description by using an example in which the inner side of the first damper 61 is connected to the damper bracket 70 (as shown in FIG. 8).

In addition, as shown in FIG. 8, the second damper 62 in the speaker 10 may be arranged between the connecting member 503 and the side wall A2 of the accommodating cavity 100. An inner side of the second damper 62 may be connected to the connecting member 503 by using an adhesive, and an outer side of the second damper 62 may be connected to the side wall A2 of the accommodating cavity 100 by using an adhesive. For example, a bent part of the frame 20 may be provided with a second step surface B2, and the second step surface B2 is parallel to the bottom A1 of the accommodating cavity 100. The outer side of the second damper 62 may be bonded to the second step surface B2 by using an adhesive, and the inner side of the second damper 62 may be bonded to a surface on a side of the connecting member 501 away from the diaphragm 30 by using an adhesive. In this way, a contact area between the outer side of the second damper 62 and the frame 20 can be increased, and firmness of the connection between the outer side of the second damper 62 and the frame 20 can be improved.

It should be noted that in FIG. 8, an example in which the second step surface B2 faces the diaphragm 30 is used for description. In some other embodiments of this application, the second step surface B2 may face the bottom A1 of the accommodating cavity 100.

In this case, on one hand, the first damper 61 may be located on an inner side of the connecting member 503 (a side close to the coil 501), and the second damper 62 may be located on an outer side of the connecting member 503 (a side close to the side wall A2 of the accommodating cavity 100). In this way, even if the coil 501 operates in a high power mode and vibrates up and down at a relatively large amplitude, under the drive of the coil 501, the first damper 61 and the second damper 62 that vibrate up and down do not touch each other.

On the other hand, if the first damper 61 and the second damper 62 are arranged on a same side of the connecting member 503, to prevent the first damper 61 and the second damper 62 that vibrate up and down from touching each other, a distance between the first damper 61 and the second damper 62 needs to be increased. In this way, a height (a size in the Z direction) of the connecting member 503 is increased, thereby increasing a thickness of the speaker 10. In this application, since the first damper 61 is located on the inner side of the connecting member 503 and the second damper 62 is located on the outer side of the connecting member 503, there is no need to increase the height of the connecting member 503 to prevent the first damper 61 and the second damper 62 from touching each other.

Furthermore, as shown in FIG. 8, since the first damper 61 is located on a side (the inner side) of the connecting member 503 close to the coil 501 and the second damper 62 is located on a side (the outer side) of the connecting member 503 away from the coil 501, the first damper 61 located on the inner side of the connecting member 503 does not interfere with a component outside the connecting member 503, for example, the surround 31. This is more conducive to reducing the thickness of the speaker 10.

In addition, to enable the first damper 61 to be arranged close to the upper end of the coil 501 (the end of the coil 501 close to the diaphragm 30) and the second damper 62 to be arranged close to the lower end of the coil 501 (the end of the coil 501 away from the diaphragm 30), in some embodiments of this application, as shown in FIG. 8, when the coil 501 is not energized, the first damper 61 may be located at the upper end of the coil 501 (a side of the coil 501 close to the diaphragm 30), and the second damper 62 may be located at the lower end of the coil 501 (a side of the coil 501 away from the diaphragm 30).

In this way, a vertical projection of the entire coil 501 on the connecting member 503 may be located between a vertical projection of the first damper 61 on the connecting member 503 and a vertical projection of the second damper 62 on the connecting member 503. In this case, since the first damper 61 is located at the upper end of the coil 501 and is relatively far away from the lower end of the coil 501, torque provided by the first damper 61 for the upper end of the coil 501 is relatively large. This is more conducive to limiting roll swinging of the upper end of the coil 501. Similarly, since the second damper 62 is located at the lower end of the coil 501 and is relatively far away from the upper end of the coil 501, torque provided by the second damper 62 for the lower end of the coil 501 is relatively large. This is more conducive to limiting roll swinging of the lower end of the coil 501.

Based on this, when the coil 501 is not energized, there is a first spacing L1 between a geometric center of the vertical projection of the coil 501 on the connecting member 503 and the first damper 61. In addition, there is a second spacing L2 between the geometric center of the vertical projection of the coil 501 on the connecting member 503 and the second damper 62. L1=L2.

For example, when the coil 501 is evenly wound around the coil former 502, the geometric center of the vertical projection of the coil 501 that is not electrified on the connecting member 503 may be a center of mass of the coil 501. In this case, the spacing L1 between the center of mass of the coil 501 and the first damper 61 is equal to the spacing L2 between the center of mass of the coil 501 and the second damper 62. In this way, in the process of supporting the coil 501 by the first damper 61 and the second damper 62, magnitudes of the first restoring force F-re1 applied by the first damper 61 to the coil 501 and the second restoring force F-re2 applied by the second damper 62 to the coil 501 may be the same or approximately the same, so that in a process in which the coil 501 vibrates up and down, the axis of the coil 501 can keep overlapped with the axis (U-U) of the magnetic assembly 40 as much as possible.

In addition, an elastic coefficient of the first damper 61 may be the same as an elastic coefficient of the second damper 62. In this way, in the process of supporting the coil 501 by the first damper 61 and the second damper 62, this can be more helpful to make a value of the first restoring force F-re1 applied by the first damper 61 to the coil 501 close to or the same as a value of the second restoring force F-re2 applied by the second damper 62 to the coil 501.

Alternatively, to enable the first damper 61 to be arranged close to the upper end of the coil 501 (the end of the coil 501 close to the diaphragm 30) and the second damper 62 to be arranged close to the lower end of the coil 501 (the end of the coil 501 away from the diaphragm 30), in some other embodiments of this application, as shown in FIG. 14, when the coil 501 is not energized, the upper end a of the coil 501 (the end of the coil 501 close to the diaphragm 30) may exceed an upper surface of the first damper 61 (a surface close to the diaphragm 30). A vertical projection of the lower end b of the coil 501 (the end of the coil 501 away from the diaphragm 30) on the connecting member 503 is located between the first damper 61 and the second damper 62. In this case, the second damper 62 may be located at the lower end b of the coil 501 (the side of the coil 501 away from the diaphragm 30). In this case, the first damper 61 is relatively close to the second damper 62. This is conducive to reducing the thickness of the speaker 10.

Figure 15:
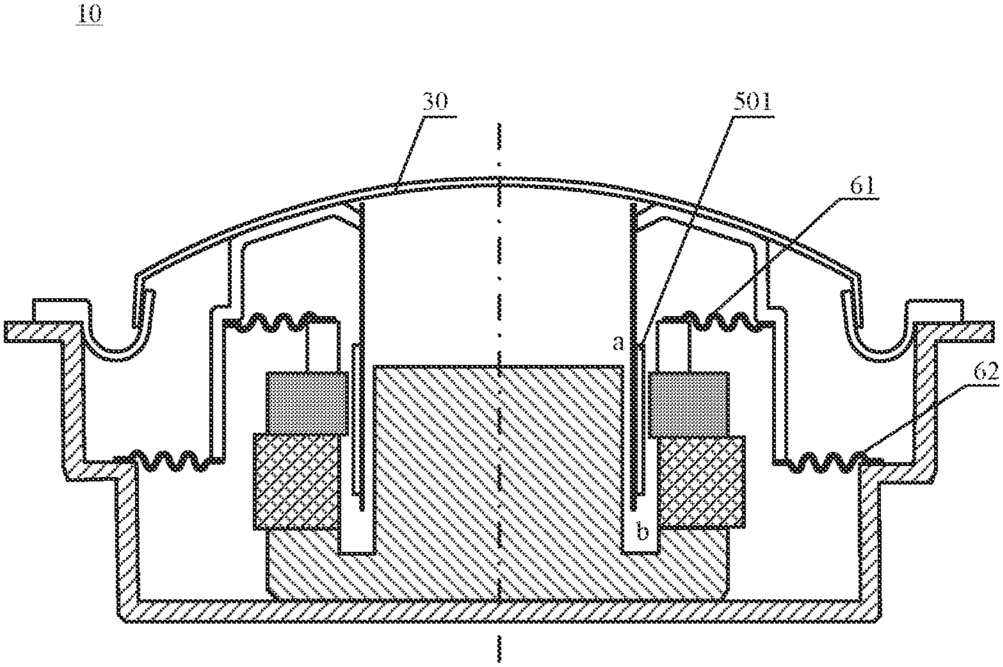
FIG. 15 is a schematic diagram of another structure of a speaker according to an embodiment of this application.

Alternatively, in some other embodiments of this application, as shown in FIG. 15, a vertical projection of the upper end a of the coil 501 (the end of the coil 501 close to the diaphragm 30) on the connecting member 503 is located between the first damper 61 and the second damper 62. In this case, the first damper 61 may be located at the upper end of the coil 501 (the side of the coil 501 close to the diaphragm 30), and the lower end of the coil 501 (the end of the coil 501 away from the diaphragm 30) may exceed a lower surface of the second damper 62 (a surface away from the diaphragm 30). In this case, the first damper 61 is relatively close to the second damper 62. This is conducive to reducing the thickness of the speaker 10.

Figure 16:
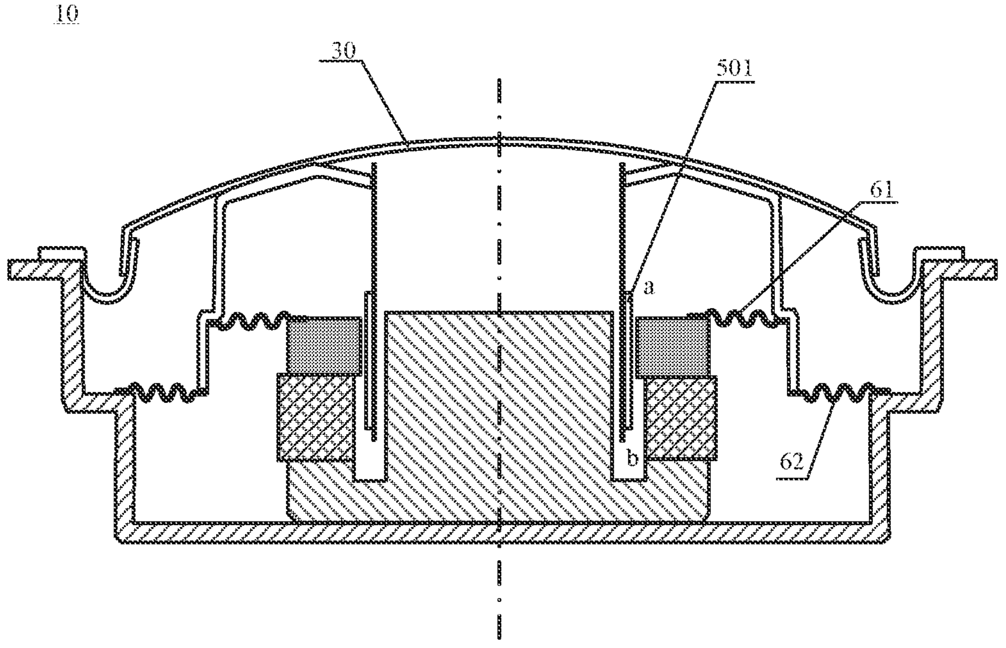
FIG. 16 is a schematic diagram of another structure of a speaker according to an embodiment of this application.

Alternatively, in some other embodiments of this application, as shown in FIG. 16, when the coil 501 is not energized, the upper end a of the coil 501 (the end of the coil 501 close to the diaphragm 30) may exceed the upper surface of the first damper 61 (the surface close to the diaphragm 30), and the lower end b of the coil 501 (the end of the coil 501 away from the diaphragm 30) may exceed the lower surface of the second damper 62 (the surface away from the diaphragm 30). In this case, the first damper 61 is relatively close to the second damper 62. This is conducive to reducing the thickness of the speaker 10.

Figure 17:
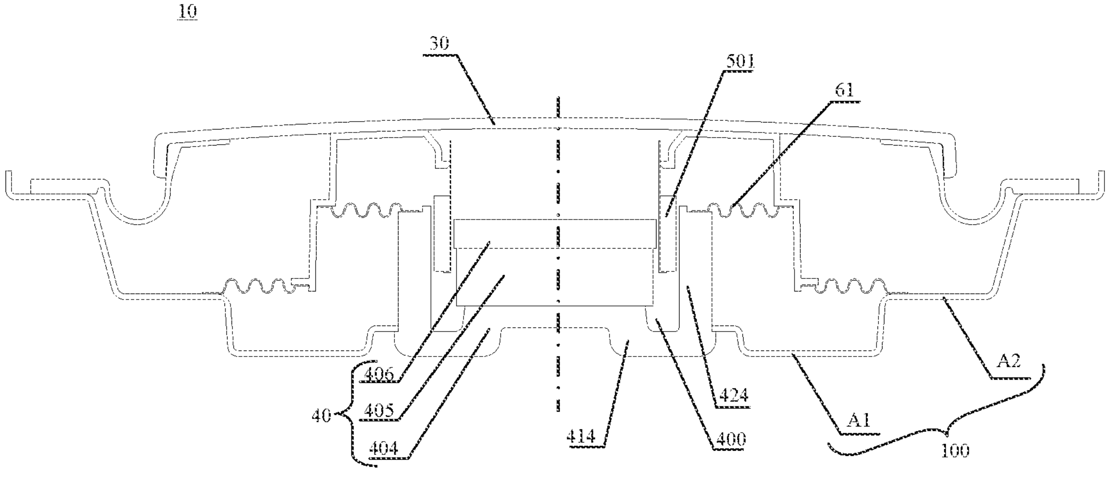
FIG. 17 is a schematic diagram of another structure of a speaker according to an embodiment of this application.

The foregoing description is provided by using an example in which the magnetic assembly 40 includes the T-yoke 401, the first magnet 402, and the washer 403. In some other embodiments of this application, as shown in FIG. 17, the magnetic assembly 40 may include a U-yoke 404, a second magnet 405, and a pole piece 406. The U-yoke 404 is provided with a groove, and a bottom 414 of the groove of the U-yoke 404 is connected to the bottom A1 of the accommodating cavity 100. A surface on a side of a side wall 424 of the groove of the U-yoke 404 close to the diaphragm 30 is connected to the inner side of the first damper 61.

For example, the bottom 414 of the groove of the U-yoke 404 may pass through a through bole in the bottom A1 of the accommodating cavity 100, and is connected to the bottom A1 of the accommodating cavity 100. In this case, one part of the U-yoke 404 may be located inside the accommodating cavity 100, and the other part of the U-yoke 404 may be located outside the accommodating cavity 100. A material of the U-yoke 404 may be iron with higher purity. A shape of a longitudinal section of the U-yoke 404 (perpendicular to the bottom A1 of the accommodating cavity 100) may be a U shape.

In addition, the second magnet 405 is located in the groove of the U-yoke 404 and is connected to the bottom 414 of the groove of the U-yoke 404. The second magnet 405 is a permanent magnet and is configured to provide a constant magnetic field in the speaker 10. The pole piece 406 is located in the groove of the U-yoke 404 and is connected to a surface on a side of the second magnet 405 close to the diaphragm 30, and a magnetic gap 400 is formed between the pole piece 406 and the side wall 424 of the groove of the U-yoke 404. The pole piece 406 may have a function of magnetic conduction.

In this way, under an action of magnetic conduction of the U-yoke 404 and the pole piece 406, a magnetic line emitted from an N pole of the second magnet 405 can pass through the U-yoke 404, pass through the coil 501 located in the magnetic gap 400, and then return to an S pole of the second magnet 405, thereby forming a magnetic loop in the magnetic assembly 40. Alternatively, a magnetic line emitted from an N pole of the second magnet 405 can pass through the coil 501 located in the magnetic gap 400, pass through the U-yoke 404, and then return to an S pole of the second magnet 405, thereby forming a magnetic loop in the magnetic assembly 40.

It should be noted that when the magnetic assembly 40 includes the U-yoke 404, the second magnet 405, and the pole piece 406, the axis U-U of the magnetic assembly 40 may be an axis of the U-yoke 404. Based on this, in some embodiments of this application, the second magnet 405 and the pole piece 406 may be cylinders, and an axis of the second magnet 405 and an axis of the pole piece 406 may be overlapped with the axis of the U-U-yoke 404, thereby generating a relatively high magnetic field intensity.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A speaker, comprising:

a frame comprising a concave accommodating cavity, wherein the concave accommodating cavity comprises:
  an opening;
  a first bottom; and
  a first side wall;

a diaphragm configured to cover the opening and coupled to the frame;

a magnetic assembly, wherein a first part of the magnetic assembly is arranged in the concave accommodating cavity and is coupled to the first bottom, and wherein of the magnetic assembly comprises a first end that is proximate to the diaphragm and that has a magnetic gap;

a vibrating assembly located in the concave accommodating cavity, coupled to the diaphragm, and comprising:
  a coil former comprising a first side proximate to the first side wall;
  a coil wound around the coil former, wherein a portion of the coil is located in the magnetic gap, and wherein the coil comprises:
    an upper end proximate to the diaphragm; and
    a lower end distal from the diaphragm; and
  a connecting member arranged on the first side;

an annular first damper proximate to the upper end, distal from the lower end, located in the concave accommodating cavity and between the coil former and the connecting member, and comprising:
  a first inner side coupled to the magnetic assembly; and
  a first outer side coupled to the connecting member to support the vibrating assembly in a first radial direction of the annular first damper; and an annular second damper proximate to the lower end, distal from the upper end, located in the concave accommodating cavity and between the connecting member and the first side wall, and comprising:
  a second inner side coupled to the connecting member; and
  a second outer side coupled to the first side wall to support the vibrating assembly in a second radial direction of the annular second damper.

2. The speaker according to of claim 1, wherein the coil further comprises:

a second side proximate to the diaphragm; and
a third side distal from the diaphragm,
wherein the annular first damper is located on the second side, and
wherein the annular second damper is located on the third side.

3. The speaker of claim 1, wherein the annular first damper further comprises a first surface proximate to the diaphragm, wherein the annular second damper further comprises a second surface distal from the diaphragm, and wherein the coil further comprises:
a second end that is proximate to the diaphragm and that extends past the first surface; and
a third end that is distal from the diaphragm and that extends past the second surface.

4. The speaker of claim 1, further comprising:
a first spacing (L1) between a geometric center of a vertical projection of the coil on the connecting member and the annular first damper; and
a second spacing (L2) between the geometric center and the annular second damper,
wherein L1=L2.

5. The speaker of claim 4, wherein a first elastic coefficient of the annular first damper is the same as a second elastic coefficient of the annular second damper.

6. The speaker of claim 1, wherein the annular first damper further comprises a surface proximate to the diaphragm, and wherein the coil further comprises:
a second end that is proximate to the diaphragm and that extends past the surface; and
a third end distal from the diaphragm, wherein a vertical projection of the third end on the connecting member is located between the annular first damper and the annular second damper.

7. The speaker of claim 1, wherein the annular second damper further comprises a surface distal from the diaphragm, and wherein the coil further comprises:
a second end proximate to the diaphragm, wherein a vertical projection of the second end on the connecting member is located between the annular first damper and the annular second damper; and
a third end that is distal from the diaphragm and that extends past the surface.

8. The speaker of claim 1, wherein the coil further comprises a first axis, wherein the annular first damper comprises a first inner hole having a second axis, wherein the annular second damper comprises a second inner hole having a third axis, wherein the second axis is overlapped with the first axis, and wherein the third axis is overlapped with the first axis.

9. The speaker of claim 8, wherein the connecting member further comprises a fourth axis overlapped with the first axis, wherein the coil former further comprises a fifth axis, and wherein the first axis is further overlapped with the fifth axis.

10. The speaker of claim 1, wherein the magnetic assembly further comprises a second side proximate to the diaphragm, wherein the speaker further comprises a damper bracket located on the second side and comprising:
a third side distal from the diaphragm; and
a fourth side proximate to the diaphragm,
wherein a first surface on the third side is coupled to the magnetic assembly, and
wherein a second surface on the fourth side is coupled to the first inner side.

11. The speaker of claim 10, wherein a height of the damper bracket is greater than an amplitude of the vibrating assembly, and wherein a direction of the height is perpendicular to the first bottom.

12. The speaker of claim 10, wherein the magnetic assembly further comprises:
a T-yoke, comprising:
a base plate coupled to the first bottom and comprising a fifth side proximate to the diaphragm; and
a pole post located on the fifth side and coupled to the first bottom;
an annular first magnet coupled to a surface on the fifth side and comprising:
a first inner hole, wherein the pole post is further located in the first inner hole; and
a sixth side proximate to the diaphragm;
an annular washer coupled to the sixth side and comprising:
a second inner hole, wherein the pole post is further located in the second inner hole;
an upper surface proximate to the diaphragm; and
an inner ring,
wherein the magnetic gap is formed between the inner ring and the pole post, and
wherein the damper bracket is further located on the upper surface.

13. The speaker of claim 12, wherein the annular washer further comprises a longitudinal section perpendicular to the first bottom and comprising:
a third part that is proximate to the diaphragm and that is a right trapezoid, wherein an inclined edge of the right trapezoid is proximate to the first side wall; and
a fourth part that is distal from the diaphragm and that is a rectangle.

14. The speaker of claim 12, wherein the coil further comprises a first axis, wherein the first inner hole further comprises a second axis, wherein the second inner hole further comprises a third axis, wherein the pole post further comprises a fourth axis, wherein the second axis and the third axis are overlapped with the fourth axis, and wherein the first axis is overlapped with the fourth axis.

15. The speaker of claim 1, wherein the magnetic assembly further comprises:
a U-yoke comprising a groove, wherein the groove comprises:
a second bottom coupled to the first bottom; and
a second side wall comprising a second side, wherein a surface on the second side is proximate to the diaphragm and is coupled to the first inner side;
a second magnet located in the groove, coupled to the second bottom, and comprising a third side proximate to the diaphragm; and
a pole piece located in the groove and coupled to the third side,
wherein the magnetic gap is formed between the pole piece and the second side wall.

16. The speaker of claim 15, wherein the U-yoke further comprises a first axis, wherein the second magnet and the pole piece are cylinders, wherein the second magnet of comprises a second axis, wherein the pole piece comprises a third axis, wherein the second axis and the third axis are overlapped with the first axis, and wherein the coil comprises a fourth axis overlapped with the first axis.

17. The speaker of claim 1, wherein the connecting member comprises:

a second side distal from the diaphragm, wherein the second inner side is attached to a surface on the second side; and a first step surface parallel to the first bottom and bonded to the first outer side, wherein the frame further comprises a second step surface parallel to the first bottom and attached to the second outer side.

18. The speaker of claim 1, wherein the connecting member comprises a second end proximate to the diaphragm and coupled to the diaphragm, and wherein the coil former further comprises a third end proximate to the diaphragm and coupled to the connecting member.

19. The speaker of claim 1, wherein the coil former further comprises a second end proximate to the diaphragm and coupled to the diaphragm, and wherein the connecting member comprises a third end proximate to the diaphragm and coupled to the coil former.

20. A terminal, comprising:

a speaker comprising:

a frame comprising a concave accommodating cavity, wherein the concave accommodating cavity comprises:

an opening;

a first bottom; and a first side wall;

a diaphragm configured to cover the opening and coupled to the frame;

a magnetic assembly, wherein a first part of the magnetic assembly is arranged in the concave accommodating cavity and is coupled to the first bottom, and wherein the magnetic assembly comprises a first end that is proximate to the diaphragm and that has a magnetic gap;

a vibrating assembly located in the concave accommodating cavity, coupled to the diaphragm, and comprising:

a coil former comprising a first side proximate to the first side wall;

a coil wound around the coil former, wherein a portion of the coil is located in the magnetic gap, and wherein the coil comprises:

an upper end proximate to the diaphragm; and a lower end distal from the diaphragm; and a connecting member arranged on the first side;

an annular first damper proximate to the upper end, distal from the lower end, located in the concave accommodating cavity between the coil former and the connecting member, and comprising:

a first inner side coupled to the magnetic assembly; and a first outer side coupled to the connecting member to support the vibrating assembly in a first radial direction of the annular first damper; and an annular second damper proximate to the lower end, distal from the upper end, located in the concave accommodating cavity between the connecting member and the first side wall, and comprising:

a second inner side coupled to the connecting member; and a second outer side coupled to the first side wall to support the vibrating assembly in a second radial direction of the annular second damper; and a housing comprising a mounting hole, wherein a third part of the speaker is located in the mounting hole.

* * * * *